(12) United States Patent
Dao et al.

(10) Patent No.: US 11,425,637 B2
(45) Date of Patent: Aug. 23, 2022

(54) SYSTEM AND METHOD FOR UE CONTEXT AND PDU SESSION CONTEXT MANAGEMENT

(71) Applicants: Ngoc Dung Dao, Ottawa (CA); Xu Li, Nepean (CA)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 16/705,942

(22) Filed: Dec. 6, 2019

(65) Prior Publication Data

US 2020/0154350 A1     May 14, 2020

Related U.S. Application Data

(63) Continuation of application No. 15/898,442, filed on Feb. 17, 2018, now Pat. No. 10,999,787.

(51) Int. Cl.
| | |
|---|---|
| *H04W 48/18* | (2009.01) |
| *H04W 36/00* | (2009.01) |
| *H04W 8/20* | (2009.01) |
| *H04W 8/08* | (2009.01) |
| *H04W 28/02* | (2009.01) |
| *H04W 48/16* | (2009.01) |

(52) U.S. Cl.
CPC ............. *H04W 48/18* (2013.01); *H04W 8/08* (2013.01); *H04W 8/20* (2013.01); *H04W 36/0009* (2018.08); *H04W 36/0011* (2013.01); *H04W 36/0033* (2013.01); *H04W 28/0268* (2013.01); *H04W 48/16* (2013.01)

(58) Field of Classification Search
CPC ... H04W 48/18; H04W 36/0009; H04W 8/08; H04W 8/20; H04W 36/0011; H04W 36/0033; H04W 48/16
See application file for complete search history.

(56) References Cited

U.S. PATENT DOCUMENTS

| | | |
|---|---|---|
| 10,110,495 B1 | 10/2018 | Sabella et al. |
| 2016/0007138 A1* | 1/2016 | Palanisamy ............. H04W 4/50 455/41.2 |
| 2017/0118667 A1* | 4/2017 | Mattsson .............. H04W 64/00 |
| 2017/0359749 A1 | 12/2017 | Dao |
| 2018/0192472 A1 | 7/2018 | Callard |
| 2018/0227871 A1 | 8/2018 | Singh et al. |

(Continued)

FOREIGN PATENT DOCUMENTS

| | | |
|---|---|---|
| WO | 2017197273 A1 | 11/2017 |
| WO | 2017201157 A1 | 11/2017 |

OTHER PUBLICATIONS

3GPP TS 23.501 V15.0.0, 3rd Generation Partnership Project;Technical Specification Group Services and System Aspects;System Architecture for the 5G System;Stage 2(Release 15), Dec. 2017. total 181 pages.

(Continued)

*Primary Examiner* — Samina F Choudhry

(57) ABSTRACT

There is provided systems and methods for the grouping of UEs, such that UEs can share a UE group context or share a PDU session context or both. In this manner, network resource usage, with respect to UE context and PDU session context management, can be mitigated.

23 Claims, 16 Drawing Sheets

Receive request from UE of a UE Group
101

Generate a UE Group context for the UE Group
102

(56) References Cited

U.S. PATENT DOCUMENTS

| | | | |
|---|---|---|---|
| 2018/0270778 A1 | 9/2018 | Bharatia | |
| 2019/0074887 A1 | 3/2019 | Yiu et al. | |
| 2019/0124181 A1* | 4/2019 | Park | H04W 74/0833 |
| 2019/0166467 A1* | 5/2019 | Livanos | H04W 8/186 |
| 2019/0174449 A1* | 6/2019 | Shan | H04W 60/00 |
| 2020/0322884 A1* | 10/2020 | Di Girolamo | H04W 4/70 |

OTHER PUBLICATIONS

3GPP TSG-SA WG2 Meeting #125, S2-180470, Ericsson et al. Application Trigger procedure updates, Gothenburg, Sweden, Jan. 22-26, 2018, total 7 pages.

3GPP TSG-SA WG2 Meeting #125, S2-181357, Ericsson et al. Application Trigger procedure updates, Gothenburg, Sweden, Jan. 22-26, 2018, (Revision of S2-181131 and 0470). Total 7 pages.

3GPP TSG SA WG2 Meeting #122bis, S2-175779, Huawei, HiSilicon:"TS 23.501: AF influenced PDU session establishment and DN authentication/authorization via NEF", Aug. 21-Aug. 25, 2017, Sophia Antipolis, France, (revision of S2-174435), total 6 pages.

3GPP TSG-SA WG2 Meeting #125,S2-180154, Huawei, HiSilicon:"Clarification on Area of Interest for Presence Area Reporting", Gothenburg, Sweden, Jan. 22-26. 2018. total 6 pages.

"System Architecture for the 5G System; Stage 2"; 3GPP TS 23.501 V2.0.1 (Dec. 2017).

"Procedures for the 5G System; Stage 2"; 3GPP TS 23.502 V2.0.0 (Dec. 2017).

3GPP TS 23.502 V1.3.0 (Nov. 2017), 3rd Generation Partnership Project; Technical Specification Group Services and System Aspects; Procedures for the 5G System; Stage 2 (Release 15), total 215 pages.

* cited by examiner

SYSTEM AND METHOD FOR UE CONTEXT AND PDU SESSION CONTEXT MANAGEMENT

CROSS-REFERENCE TO RELATED APPLICATION

This application is a continuation of U.S. patent application Ser. No. 15/898,442, filed Feb. 17, 2018, which is herein incorporated by reference.

FIELD OF THE INVENTION

The present invention generally pertains to the field of communication networks, and particular embodiments or aspects relate to management of UE contexts and PDU session contexts.

BACKGROUND

Based on LTE network architecture, when a user equipment (UE) is turned on and attaches to the network, the mobility management entity (MME) creates a UE context. The MME assigns a unique short temporary identifier termed the SAE temporary mobile subscriber identity (S-TMSI) to the UE that identifies the UE context in the MME. This UE context holds user subscription information downloaded from the home subscribe server (HSS). The local storage of subscription data in the MME allows faster execution of procedures such as bearer establishment since it removes the need to consult the HSS every time. In addition, the UE context also holds dynamic information such as the list of bearers that are established and the terminal capabilities. As would be readily understood, this UE context information is also used by a base station, for example an evolved NodeB (eNB) associated or connected with the UE, for example eNB UE context which is a block of information in an eNB associated to one active UE.

In addition, a UE receives services through a protocol data unit (PDU) session, which is a logical connection between the UE and the data network. The UE requests the establishment of the PDU session and as such, in the present context, the UE has an associated UE context and a PDU session context, which has to be stored and managed by the communication network in order to provide the UE with the desired functionality.

The 3$^{rd}$ Generation Partnership Project (3GPP) technical report numbered TR 23.799 and entitled "Study on Architecture for Next Generation System," version 14.0.0, December 2016 (hereinafter referred to as TR 23.799), represents one approach to the design of a system architecture for next generation mobile networks, also referred to as 5$^{th}$ generation (5G) networks. In proposed "next generation" (NG) networks, such as 5G wireless communication networks, additional flexibility and functionality is available to the network. Furthermore, it is proposed to have many more connections to the network as the Internet of Things (IoT) brings connectivity to a new range of devices. Moreover, in NG networks, it is supported that a UE can establish multiple PDU sessions to the same data network. As such, there is a need to manage network resource usage, for example storage, computing and signalling.

Accordingly, there may be a need for a system and method for the management of UE contexts or PDU session contexts or both, that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

In accordance with an aspect of the present invention there is provided a method for selecting a network exposure function (NEF) in a communication network. The method includes obtaining, by an application function (AF), information on a UE and information on a set of NEFs, the set of NEFs including one or more NEFs, selecting, by the AF, a NEF based on the obtained information and enforcing, by the AF, the selected NEF to serve the UE.

In accordance with an aspect of the present invention there is provided a network function including a network interface for receiving data from and transmitting data to network functions connected to a network and a processor. The network function further including a non-transient memory for storing instructions that when executed by the processor cause the network function to be configured to obtain information on a UE and information on a set of NEFs, the set of NEFs including one or more NEFs, select a NEF based on the obtained information and enforce the selected NEF to serve the UE.

In some embodiments, the selected NEF is different from the source NEF serving the UE before the selection of the selected NEF. However, it will be readily understood that the selected NEF may in fact be the same NEF as the source NEF in instances where an improved choice for NEF does not exist. According to embodiments, the application function (AF) provides information to a common API framework (CAPIF) core function, wherein this information can be used for NEF selection. In some embodiments, the CAPIF core function may provide a list of suitable NEFs from which the AF can select the NEF. It is readily understood that one or more of the above can be included in an embodiment.

In some embodiments, the obtaining information comprises receiving, by the AF, a UE context of the UE. In some embodiments the information on the NEF comprises one or more of following: PLMN ID, DNN, DNAI(s); application ID(s), AF-Service-Identifier; S-NSSAI, NSI-ID, UE group ID(s) including internal group ID, external group ID, IMSI group ID, UE ID(s), AF ID, AF IP address, AF FQDN, UPF IP address, FQDN), AMF ID, AMF IP address, AMF FQDN, SMF ID, SMF IP address and SMF FQDN. In some embodiments, enforcing the NEF includes subscribing, by the AF, to event exposure services of the selected NEF and sending, by the AF, an influence traffic routing request to the selected NEF. In some embodiments, before the selection the method includes subscribing, by the AF, to event exposure services of the source NEF and sending, by the AF, an influence traffic routing request to the source NEF. In some embodiments, after the selection, the method includes unsubscribing, by the AF, to event exposure services of the source NEF and canceling, by the AF, the influence traffic routing request with the source NEF. It will be understood that the appropriate network function can be configured to perform the above noted further method steps. It is readily understood that one or more of the above can be included in an embodiment.

In accordance with an aspect of the present invention there is provided a method for selecting a network exposure function (NEF) in a communication network. The method includes selecting a NEF to serve a UE upon receiving a trigger, the trigger resulting from one or more of UE mobility, load balancing, relocation of a NEF, denial of service attack, a reselection request and enforcing a transmission of a UE context of the UE to the selected NEF.

In accordance with an aspect of the present invention there is provided a network function including a network interface for receiving data from and transmitting data to network functions connected to a network and a processor. The network function further including a non-transient memory for storing instructions that when executed by the processor cause the network function to be configured to select a NEF to serve a UE upon receiving a trigger, the trigger resulting from one or more of UE mobility, load balancing, relocation of a NEF, denial of service attack, a reselection request and enforce a transmission of a UE context of the UE to the selected NEF.

According to some embodiments, the selection is performed by a session management function (SMF). According to some embodiments the transmission is between the selected NEF and a source NEF serving the UE before the selection. It is readily understood that one or more of the above can be included in an embodiment.

According to some embodiments, the selection is performed by a common API framework (CAPIF) core function. According to some embodiments, the transmission is between the selected NEF and a UDR. It is readily understood that one or more of the above can be included in an embodiment.

In accordance with an aspect of the present invention there is provided a method for network exposure function (NEF) relocation in a communication network. The method includes receiving, by a NEF, a UE context of a UE and subscribing, by the NEF, to a service of a control plane network function based on the received UE context of the UE.

In accordance with an aspect of the present invention there is provided a network function including a network interface for receiving data from and transmitting data to network functions connected to a network and a processor. The network function further including a non-transient memory for storing instructions that when executed by the processor cause the network function to be configured to receive a UE context of a UE and subscribe to a service of a control plane network function based on the received UE context of the UE.

In some embodiments, the service of the control plane network functions includes one or more of subscribing, by the NEF, to event exposure services of a session management function (SMF), subscribing, by the NEF, to event exposure services of an access management function (AMF), subscribing, by the NEF, to event exposure services of an unified data management (UDM) function and subscribing, by the NEF, to event exposure services of an policy control function (PCF). According to some embodiments, the UE context of the UE is received from a source NEF serving the UE or a unified data repository (UDR). In some embodiments, the NEF is selected by an application function (AF), or a session management function (SMF), or a common API framework (CAPIF) core function to serve the UE as a source NEF after the selection. It will be understood that the appropriate network function can be configured to perform the above noted further method steps. It is readily understood that one or more of the above can be included in an embodiment.

In accordance with an aspect of the present invention there is provided a method for managing user equipment (UE) in a communication network. The method includes receiving, by a network function, a request from a UE, said UE belonging to a UE group and generating, by the network function, a UE group context.

In accordance with an aspect of the present invention there is provided a network function including a network interface for receiving data from and transmitting data to network functions connected to a network and a processor. The network function further including a non-transient memory for storing instructions that when executed by the processor cause the network function to be configured to receive a request from a UE, said UE belonging to a UE group and generate a UE group context.

According to some embodiments, the UE group context includes a UE group identifier. According to embodiments, the UE group context includes one or more protocol data unit (PDU) session contexts, and their PDU session identifiers. According to embodiments, the UE group context includes one or more shared protocol data unit (PDU) session context and their identifiers. According to embodiments, the UE group context includes a list of UE IDs which are members of the UE group. It is readily understood that one or more of the above can be included in an embodiment.

In accordance with an aspect of the present invention there is provided a method for managing user equipment (UE) in a communication network. The method includes receiving, by a network function, a request including data indicative of a UE group and transmitting, by the network function, a notification, the notification based upon the request and the data.

In accordance with an aspect of the present invention there is provided a network function including a network interface for receiving data from and transmitting data to network functions connected to a network and a processor. The network function further including a non-transient memory for storing instructions that when executed by the processor cause the network function to be configured to receive a request including data indicative of a UE group and transmit a notification, the notification based upon the request and the data.

According to some embodiments, the data includes a protocol data unit (PDU) session identifier. According to some embodiments, the data includes a shared protocol data unit (PDU) session identifier. According to some embodiments, the request includes a request for modification of a shared PDU session and wherein the notification includes a rejection. According to some embodiments, the request includes a network exposure function (NEF) relocation request and wherein the notification includes data indicative of a UE group context and wherein the UE group context includes one or more of a UE group identifier, protocol data unit (PDU) session identifier and a shared PDU session identifier. It is readily understood that one or more of the above can be included in an embodiment.

In accordance with an aspect of the present invention, there is provided a method for selecting or reselecting a network exposure function (NEF) in a communication network. The method includes receiving, by a target application function (T-AF), a UE context, subscribing, by the T-AF, to event exposure services of a source NEF and sending, by the T-AF, an influence traffic routing request to the source NEF. The method further includes, upon determining a target NEF, subscribing, by the T-AF, to event exposure services of the target NEF and sending, by the T-AF, an influence traffic routing request to the target NEF.

In accordance with an aspect of the present invention, there is provided a network function including a network interface for receiving data from and transmitting data to network functions connected to a network, a processor and a non-transient memory for storing instructions. The instructions, when executed by the processor cause the network function to be configured to receive a UE context, subscribe to event exposure services of a source NEF and send an influence traffic routing request to the source NEF. The instructions, when executed by the processor cause the network function to be configured to upon determination of a target NEF, subscribe to event exposure services of the target NEF and send an influence traffic routing request to the target NEF.

According to some embodiments, the method further includes unsubscribing, by the T-AF, to event exposure services of the source NEF and canceling, by the T-AF, the influence traffic routing request with the source NEF. It will be understood that the appropriate network function can be configured to perform the above noted further method steps. It is readily understood that one or more of the above can be included in an embodiment.

In accordance with an aspect of the present invention, there is provided a method for selecting or reselecting a network exposure function (NEF) in a communication network. The method includes receiving, by a target NEF, a UE context transfer request, subscribing, by the target NEF, to services of control plane network functions and sending, by the target NEF, a UE context transfer response.

In accordance with an aspect of the present invention, there is provided a network function including a network interface for receiving data from and transmitting data to network functions connected to a network, a processor and a non-transient memory for storing instructions. The instructions, when executed by the processor cause the network function to be configured to receive a UE context transfer request, subscribe to services of control plane network functions and send a UE context transfer response.

According to some embodiments, subscribing to services of control plane network functions includes one or more of subscribing, by the target NEF, to event exposure services of a session management function (SMF), subscribing, by the target NEF, to event exposure services of an access management function (AMF), subscribing, by the target NEF, to event exposure services of an unified data management (UDM) function and subscribing, by the target NEF, to event exposure services of an policy control function (PCF). It will be understood that the appropriate network function can be configured to perform the above noted further method steps. It is readily understood that one or more of the above can be included in an embodiment.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may provide a reduction in network resource usage, with respect to UE context and PDU session context management.

BRIEF DESCRIPTION OF THE FIGURES

Further features and advantages of the present invention will become apparent from the following detailed description, taken in combination with the appended drawings, in which.

DETAILED DESCRIPTION

The present disclosure is directed to systems and methods for UE context and PDU session management. It has been observed that with the increase in applications including IoT devices, there will be a large demand on communication network resources in order to provide a desired level of service for this increase in demand, for example the storage and signalling of required by the network in order to manage UE context and PDU session context data for these UEs or electronic devices. Furthermore, it has been observed that particular groups of UEs or electronic devices can have the same capabilities and subscribed services. Thus there is provided systems and methods for the grouping of UEs, such that UEs can share a UE group context or share a PDU session context or both. In this manner, network resource usage, with respect to UE context and PDU session context management, can be mitigated. It will be readily understood that while it is envisioned that the term group can be used to define a plurality of UEs that share the same context, other terms may at least equally be used for example, collection of UEs or set of UEs.

According to embodiments, a UE requests that a new PDU session be established. A control plane (CP) function, for example a session management function (SMF) can evaluate the request and determine if the requested new PDU session is to be a mapped to a new PDU session or to an existing shared PDU session. This mapping can be performed wherein the SMF can map the PDU session ID, which is generated by the UE upon requesting the PDU session, to the new PDU session or to an existing PDU session that is to be shared amongst several UEs.

According to embodiments, by sharing PDU sessions for a group of UEs, if a control plane (CP) network function (NF) needs to send one or more control messages or modifications to a plurality of PDU sessions which happen to be all mapped to the shared PDU session, only a single control message would have to be sent to modify the shared PDU session, instead of control messages to each of the PDU sessions associated with the shared PDU session, or PDU sessions associated with UEs of a UE group. For example, the control plane function, for example a policy control function (PCF), session management function (SMF), access management function (AMF) or a network exposure function (NEF), would only have to send one control message to modify the shared PDU session context instead of multiple control messages, each control message is to modify a PDU session context of an individual UE context. As such, according to embodiments, there can be a reduction in network resource usage for management of the UEs and PDU sessions, for example a reduction in required storage, computing and signalling. This reduction in network usage can also be considered to be a reduction in internal operation of UP and CP functions when modifying parameters of a large number of UEs and PDU sessions.

Figure 1:
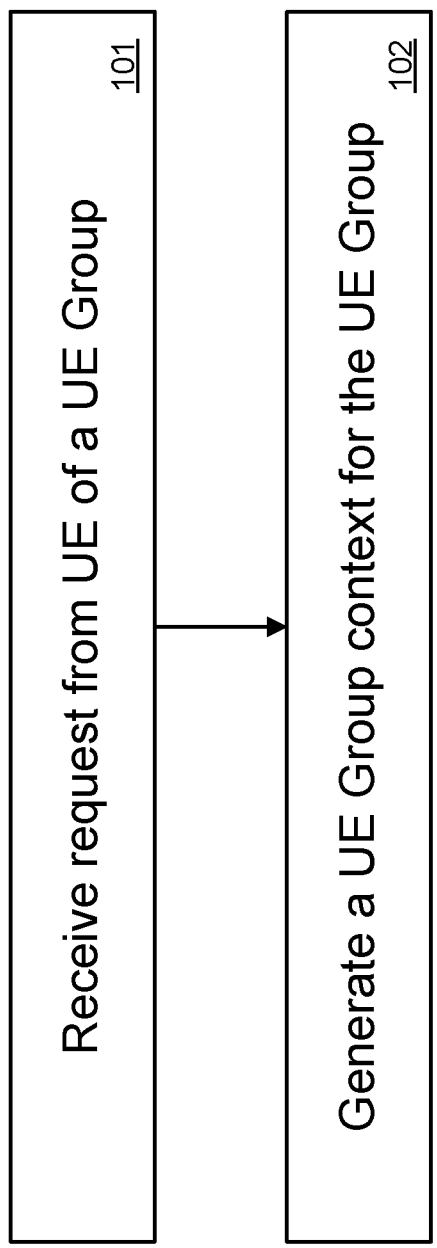
FIG. 1 illustrates a method for UE context and PDU session context management, in accordance with embodiments of the present invention.

According to embodiments, there is provided a method for UE context and PDU session context management. With reference to FIG. 1, upon receiving 101 a request from a UE which is a member of a UE group by a network function, the network function proceeds to generate 102 a UE group context which is indicative of the UE group. For example, the UE context can include data indicative of a UE group identifier (ID), one or more PDU session identifiers, which may include PDU session identifiers and shared PDU session identifiers, and a list of UE IDs which are members of the UE group. In some embodiments, the UE group context can include data indicative of quality of service (QoS) or charging policies or both to be applied for PDU sessions or shared PDU sessions of UEs in the UE groups. According to embodiments, the network function can be an access management function (AMF), session management function (SMF), network exposure function (NEF), policy and control function (PCF), user plane function (UPF), (Radio) Access Network ((R)AN) node, Unified Data Repository (UDR), Unified Data Management (UDM), Network Slice Selection Function (NSSF), NF repository function (NRF), or other network functions.

Figure 2:
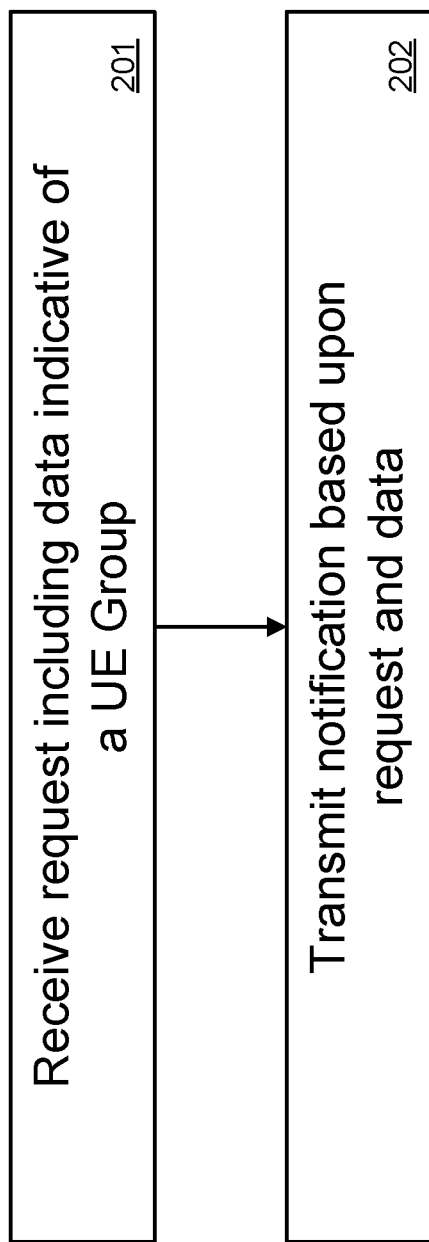
FIG. 2 is a method for UE context and PDU session context management, in accordance with embodiments of the present invention.

According to embodiments, there is provided a method for UE context and PDU session context management. With reference to FIG. 2, upon receiving 201 a request which includes data indicative of a UE group by a network function (NF), the network function proceeds to transmit 202 a notification wherein this notification is based upon the request and the data. For example, the data can include information indicative of a UE group, and the request is indicative of a modification of the service for the UEs which are included within the UE group. The information indicative of the UE group can be considered as part of the UE group context and the UE group context can include data indicative of one or more of UE group identifier (ID), one or more of PDU session identifier, one or more of shared PDU session identifier and a list of UE IDs which are members of the UE group. In some embodiments, the UE group context can include data indicative of quality of service (QoS) or charging policies or both to be applied to a PDU session or shared PDU session of the member UEs of the UE group. According to embodiments, the network function can be an AMF, SMF, NEF, PCF, UPF, (R)AN, UDR, UDM, NSSF, NRF, or other network functions.

Figure 3:
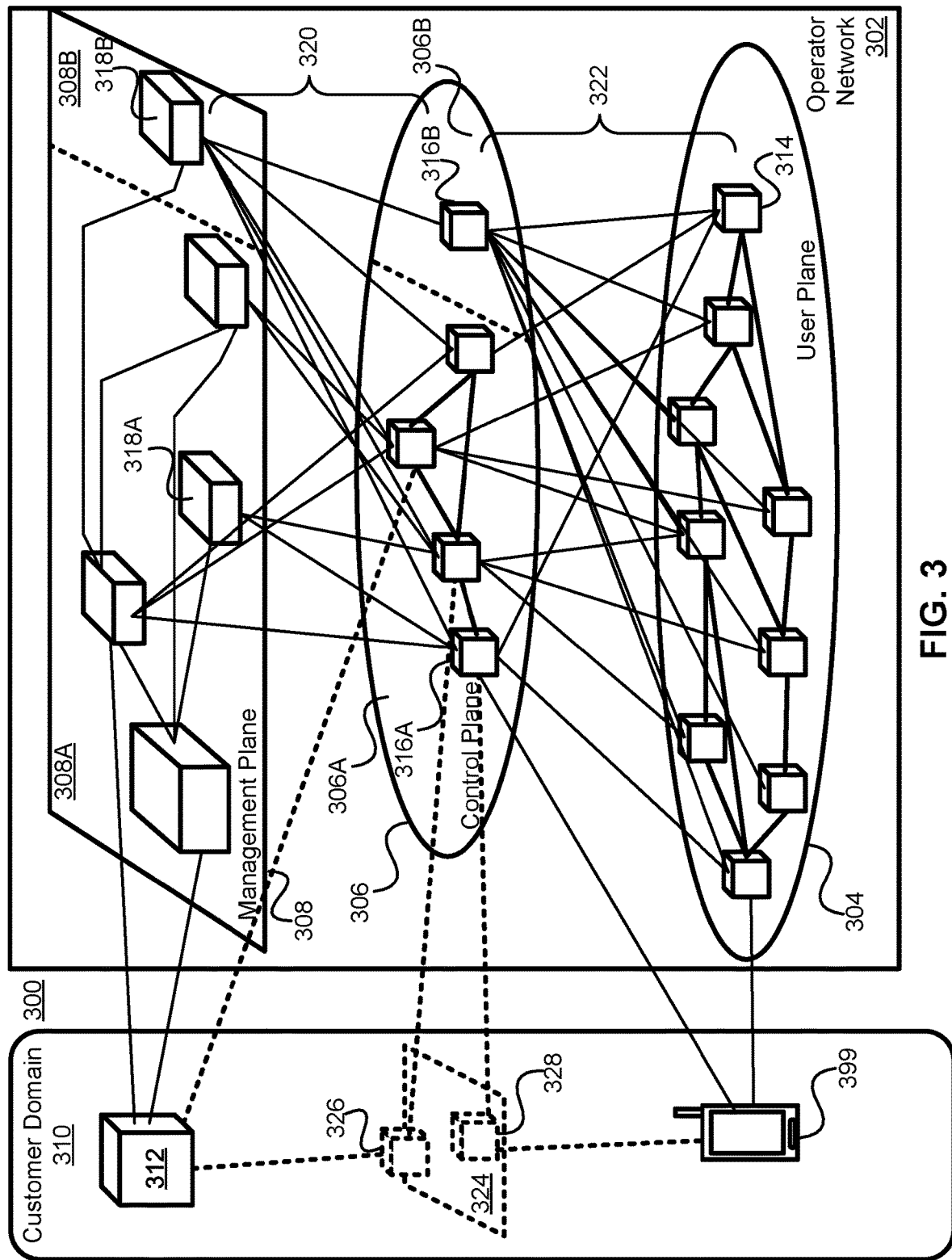
FIG. 3 is a diagram illustrating an embodiment of interactions between the Management Plane, Control Plane and User Plane of a network.

In order to provide context to the instant application, which is directed towards interactions between a UE and a communication network, FIG. 3 is provided to illustrate a network architecture 300 in which the resources of the operator network 302 are divided into a set of logical planes, a user plane (UP) 304, a control plane (CP) 306 and a management plane (MP) 308. The UP 304 is typically focussed on packet transport, but certain functions including packet filtering and traffic shaping can be performed in the UP 304, although this is typically performed based on instructions from a network function in the CP 306. Functions in the MP 308 receive input from network functions within the customer domain 310 about the policies that should be enforced by the network control functions in the control plane 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 304 may also be referred to as a data plane. It carries the traffic between an ED 399 and either external data networks (not shown) or functions within the operator network. UP 302 is typically composed of user plane functions (UPFs) 314. As would be readily understood in some instances, an ED can be a user equipment (UE). In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for data plane traffic to be transmitted. As would be readily understood, there are one or more (R)AN nodes that are positioned between the UE and the UPF, which can at least in part provide interconnectivity therebetween.

The control plane 306 may be composed of control plane functions (CPF) 316. In a 3GPP compliant network, some control plane functions 316A have functions defined by standards, while other control plane functions 316B may be outside the specification of the relevant standards. This may effectively result in the control plane 306 being divided into a standards compliant control plane segment 306A and a non-standards compliant control plane segment 306B. In a 3GPP compliant control plane segment 306A, network functions 316A such as an AMF, SMF, NEF, authorization and security function (AUSF), etc. may be present, and in some embodiments more than one instance of any or all of the functions may be present. In a non-standards compliant control plane segment 306B, a network function 316B such as a function to perform software-defined network (SDN) Controller, or other such controllers including a service-oriented virtual network auto-creation operation (SONAC-Ops) controller, may be instantiated. Control plane functions 316, may be connected to other CPFs, as shown by functions 316A, but this is not necessarily required as may be seen by CPF 316B. ED 399 may also communicate with CPFs.

The management plane 308 can be divided between a standards compliant section 308A and a non-standards compliant section 308B, much as CP 306 is divided. Within MP 308, network functions and nodes 318 can communicate with each other, and with a network function or node 312 within the customer domain 310. Management plane entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network management functions (NMF) 318 may be responsible for accounting and billing functions, for element management, they may provide the services required for an operation support system (OSS) and a business support subsystem (BSS). Outside the standardized functions, non-standardized network functions 318B may include a network function virtualization management and orchestration (NFV-MANO) system and a service-oriented virtual network auto-creation composition (SONAC-Com) controller.

NMFs 318 can receive external input from a customer node 312, and can communicate with each other. NMFs 318 can also communicate, over any of the MP-CP connections 320, with CPFs 316 to provide instructions about the policies to be enforced by CPFs 316. Changes in the resources underlying the network 302 are also communicated by a NMF 318 to CPFs 316. In CP 306, CPFs communicate with each other, and with ED 399. CPF 316 are also in communication with UPFs 314 and with one or more (R)AN nodes, and through this communication they can receive information such as traffic loads on links and processing loads at network functions. In conjunctions with policy information received from NMFs 318, a CPF 316 can transmit instructions to the UPFs 314, over the CP-UP (also referred to as UP-CP) connections 322, to govern the behavior of the UPFs 314. A UPF 314 receives configuration information from a CPF 318, and handles UP traffic in accordance with the received configuration information. Loading information (which may include both processing and network connection (or link) loading) may be gathered by a UPF 314 and provided to a CPF 316.

In some embodiments, the customer network function 312 may have a connection to a CFP 316. This CPF, with which customer network function 312 communicates, may be either a 3GPP compliant CPF 316A or a non-3GPP compliant CPF 316B. In alternate embodiments, the customer network function 312 may make use of a function within management plane 308 to relay messages to functions in control plane 306. Within the customer domain 310, there may be an optional control plane 324, with customer control plane functions 326 and 328. When such a customer control plane 324 is present, function 326 and 328 may have logical communications links with either or both of ED 399 and the customer network function 312. Customer control plane functions 326 and 328 may have connections to functions within control plane 306 (either 3GPP compliant functions 316A or non-3GPP compliant functions 316B).

According to embodiments, the UE group context is created in control plane functions which can include the AMF, SMF, PCF, UDM, UDR, NEF, NSSF, NRF, and the application function (AF). The UE group context is also created in user plane functions which can include the (radio) access network ((R)AN) node, access node (AN) and UPF. It will be readily understood that while the term UE group context is used to define a plurality of UEs that share the same context, other terms may at least equally be used to defined the same feature, for example, UE shared context, UE collection context, UE set context or the like.

According to embodiments, the UE group context can be created in advance, for example by preconfiguration of the UDM or UDR or by a network management function (NMF) with the required information relating to the UE group context. For example, the UE group context can include information relating to one or more of: UE group identifier (ID), list of member UE IDs, PDU session group IDs, quality of service (QoS), charging policies or other features of the UE group context which is associated with each of the member UEs. According to embodiments, the UE group context can be created by the control plane functions and the user plane functions upon receipt of a request, such as request from the AF, or the UE, or the NMF.

According to embodiments, a number of different UEs are defined as being members of a particular UE group, and this UE group can have an associated UE group ID. According to embodiments, a UE group context can be created by the AMF. In this instance, when a first UE of a particular UE group registers with the communication network the AMF can create the UE group context in the AMF. According to some embodiments, when a first UE of a particular UE group requests a PDU session, there is an associated PDU session context. In instances where this PDU session context can be shared, for example as a shared PDU session context, the SMF creates a UE group context in the SMF. The SMF further requests the (R)AN, and UPF to establish a UE group context and/or shared PDU session context. According to some embodiments, when the AF sends the first request to the NEF for a UE group, the UE group context is created in the NEF. In some embodiments, when a first control plane function, for example the AMF, SMF or PCF, subscribes to the NEF for the notification service for relevant events or actions in relation to a particular UE group, the UE group context is created in the NEF. As the UE group context is created and stored in the NEF this can provide for a reduction in required signalling.

According to some embodiments, the NEF is preconfigured to serve a particular UE group and the AF can send a request to the NEF in order to initiate the NEF transmitting a request to set up a UE group context. For example, with reference to FIG. 4, the AF 425 sends 401 an AF request, wherein this request carries information of member UEs of a particular UE group. The request may include a transaction ID to represent this request, and information including one or more of: an external group identifier to identify the UE group, a list of external UE IDs or GPSI (Generic Public Subscription Identifier), a packet filter set or Packet Flow description (PFD) to identify downlink traffic intended to one or some or all UEs of UE group (e.g. application server IP address(es) or IP prefixes), port numbers, QoS information (e.g. maximum bit rate for each UE, maximum aggregated bit rate of all UEs, packet delay budget, packet error rate), DNAI (data network access identifier).

The NEF 424 subsequently sets up a UE group context for that particular UE group. An authentication and authorization procedure 402 is initiated between the AF 425, NEF 424, AUSF 423 and UDM 422 or UDR or both. During procedure 402, either the UDM or UDR may assign an internal group ID, which is mapped to the external group ID. The UDM or UDR informs the NEF 424 the internal group ID. Upon completion of the authentication and authorization procedure 402, the NEF 424 transmits 403 an AF request response which may indicate that the control plane is setting up the UE group context.

The NEF 424 subsequently selects 404 the UDM/UDR 422 for the setting up of the UE group context. The NEF 424 sends 405 an application data update request indicative of the UE group context to the UDM/UDR 422. The NEF 424 may provide some or all information received from the AF 425, such as the packet filter set or PFD, and QoS requirements information to the UDR.

The UDM and/or UDR may send a response message 406 to the NEF. The response message may include the Internal group ID if this parameter was not sent in procedure 402.

The UDM/UDR 422 transmits 407 an application data change notification which is indicative of the UE group context to the PCF 421. The message 407 may include the internal group ID, application ID, PFD or packet filter sets for both uplink (UL) and downlink (DL) directions, authorized QoS parameters for the member UEs (such as maximum bit rate (MBR), maximum flow bit rate (MFBR), guaranteed flow bit rate (GFBR), session-aggregated maximum bit rate (session-aggregated maximum bit rate (AMBR)), packet delay budget (PDB)), and for the UE group (e.g. UE group-AMBR), charging policy (e.g. UE group-based charging in which the charging is applied to all UEs in the UE group as a whole, not for individual UEs).

If the message 407 carry data change notification and the Internal group ID only, the PCF 421 may send a request to the UDM and/or UDR to provide the data of Internal group ID. The PCF 421 may generate in step 408 new UE related policy and UE group related policies by using the information provided by the UDM/UDR 422. The PCF 421 subsequently transits 409 a policy update notification to the SMF 420, which currently serve UEs of UE group, wherein the policy update notification is indicative of the UE group context. The PCF 421 may also send other messages (not shown in FIG. 4) to other network entities such as the AMF (that currently serve UEs of UE group) to update access and mobility policies, to the UE for UE route selection policy (URSP). The CP functions may create UE group context after receiving UE group information from the PCF. The PCF 421 may also send notification message to NSSF, which include Internal group ID and member UEs of internal group. When an CP function is selected later, the NSSF may use the UE group information to make sure that the same SMF or AMF is used to serve all the UEs of UE group that are currently associated to the (R)AN nodes that are in the same service area of the AMF or in the same service area of the SMF.

Figure 4:
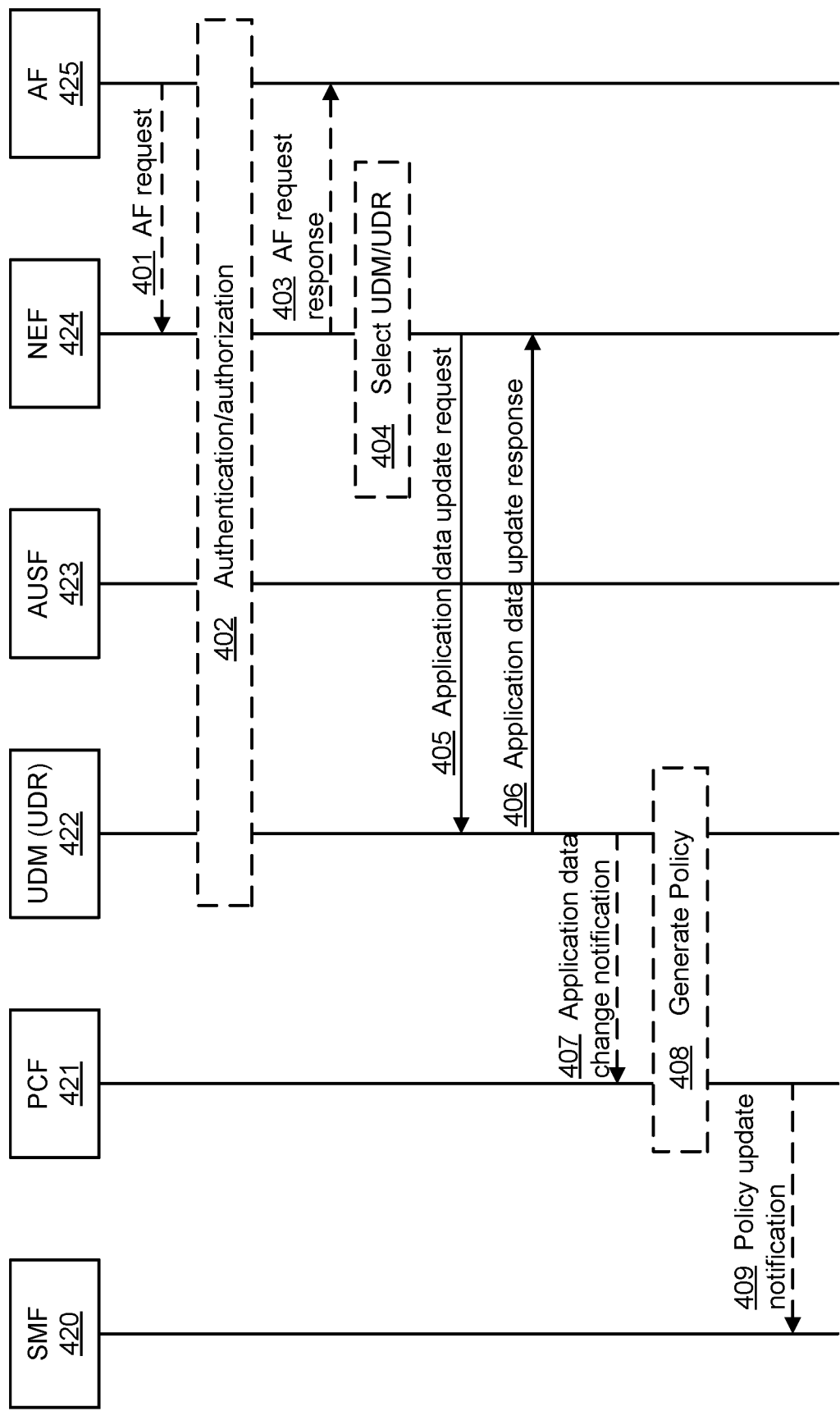
FIG. 4 illustrates a method for setup of UE group context in accordance with embodiments of the present invention.

According to some embodiments, the messages exchanged among NFs in FIG. 4 and other figures as present in the instant application, can be alternatively implemented by using existing or new service-based interface services of NFs.

Figure 5:
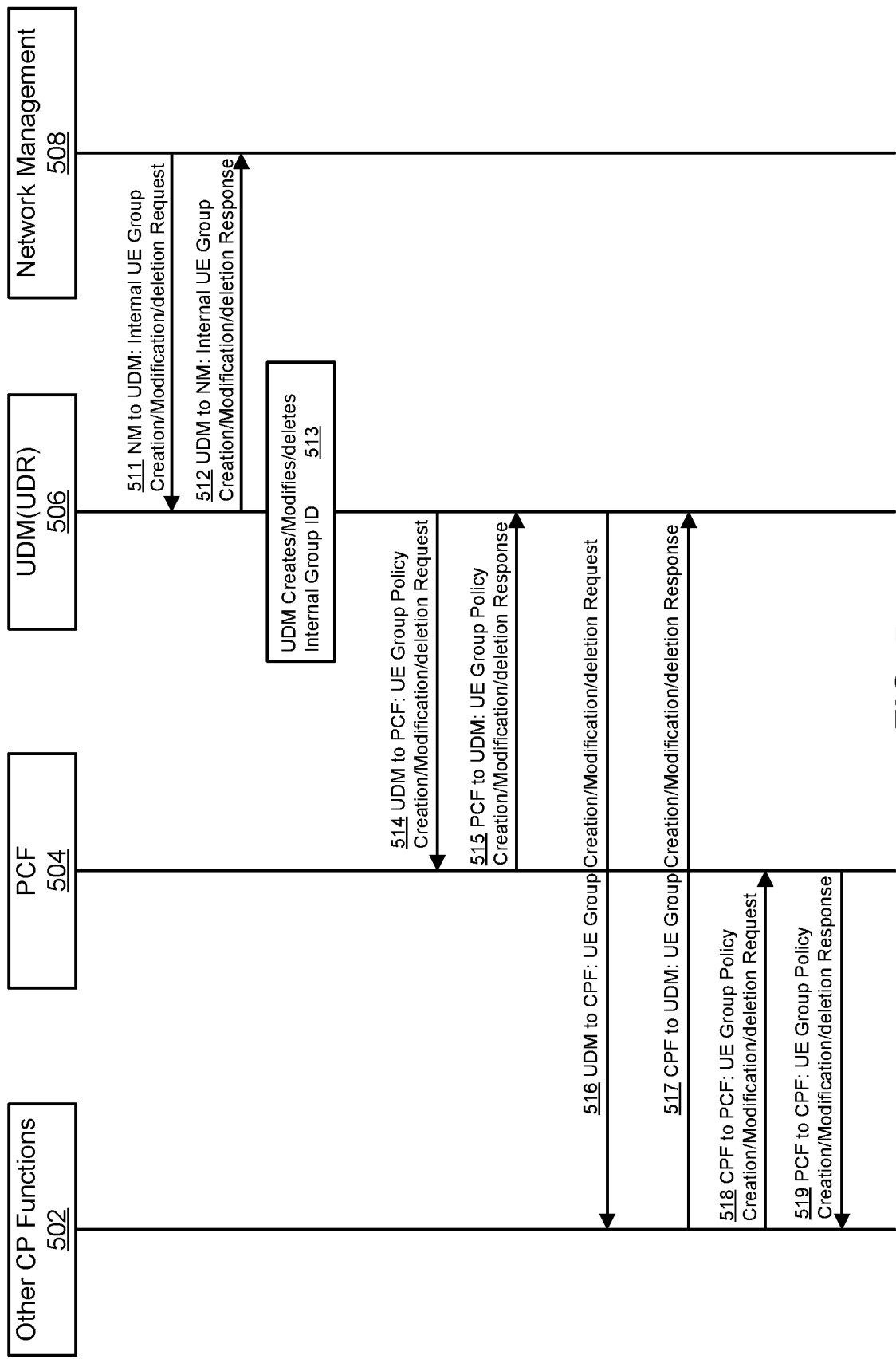
FIG. 5 illustrates a method of UE group context creation triggered by a network management function in accordance with embodiments of the present invention.

FIG. 5 illustrates a method of UE group context creation triggered by a network management function in accordance with embodiments of the present invention. The network management function (NMF) 508 sends 511 to the UDM (or UDR) 506 a message as an Internal UE group creation/modification/deletion request. The message may include the list of UE IDs (e.g. permanent equipment identifier (PEI), subscriber permanent identifier (SUPI), IMSI, GPSI), or the network slice information (e.g. S-NSSAI, NSSAI), device owner identifier, application identifier, and other information to filter the UEs. The message may include default CP network functions to serve the UE group. The UDM (or UDR) 506 confirms the reception of the message by sending a response 512 to the NMF 508. The UDM (or UDR) 506 creates 513 an UE group context in UDM (or in UDR) 506, represented by a unique UE group ID (such as internal group ID). The UE group context may be stored in either the UDM, or UDR, or both the UDM and UDR. The UE context may include the UE IDs of UEs in the group, and other related information from the service subscription information. The UDM (or UDR) 506 sends 514 to the PCF 504 a message as a UE group policy creation/modification/deletion request. The message may include UE group ID, UE IDs of UE group, service subscription information. The PCF 504 creates a UE group context. The UE group context may include UE group ID, UE IDs, and UE group policies such as QoS policy, charging policy, network slice selection policy, UE traffic routing policy (such as UE route selection policy (URSP)). The PCF 504 sends 515 to UDM 506 a message as a UE group policy creation/modification/deletion request to confirm the reception of message. The UDM 506 may request 516 other CP functions to create/modify/delete UE group context.

Optionally, in some embodiments, for UE group context creation, the UDM 506 may use the network function information provided by the NMF 508 to identify the CPF 502. Alternatively, the UDM may discover the CP function by getting information from network repository function (NRF). If the UE group context has been created in CPF 502, the CPF may register themselves to the UDM. The UDM can provide UE group updates to the CPF 502 by modify/delete messages.

According to embodiments, once the CPFs are selected to serve a specific UE group, the UDM may inform the NRF which CP functions are selected to serve the UE group. The message from the UDM to the NRF may include the UE group ID, application ID, and UE IDs. The information on the UE group and UE IDs, application ID and other information available in the NRF (such as network slice information) can be used for CP NF selection, such as AMF, SMF and PCF, so that the same set of CP NFs may be selected to serve all UEs of a UE group in some geographic area, or in the same registration area managed by a specific AMF. In some embodiments, the UE group information (e.g. including UE group ID, UE IDs of UE group, application ID) may be preconfigured by the NMF 508 in the NRF.

With further reference to FIG. 5, the CPF 502 sends 517 to the UDM 506 a message as a UE group creation/modification/deletion response for the message received. The CPF 502 may send 518 to the PCF 504 a message as a UE group policy creation/modification/deletion request. According to embodiments, for new a UE group, the CPF requests the PCF to send UE group policies. The policies may include policies that apply to all the UEs of the UE group, and/or policies that apply to individual UEs. The CPF also register itself with the PCF in order to get policy updates. According to embodiments, for an existing UE group, if the PCF does not send policy updates to CPF, the CPF may request the PCF to send updated policies. According to embodiments, if the UE group is deleted, the CPF can request the PCFs to remove their subscription from policy update services of the PCF. The PCF 504 sends 519 to CPF 502 a message as a UE group policy creation/modification/deletion request to acknowledge the reception of message.

According to some embodiments, the UE group context includes information indicative of the UE group ID, a list of UE IDs of each UE that is a member of the UE group and a list of PDU session group IDs. In this embodiment, a UE can have a particular PDU session ID associated therewith, wherein this PDU session ID is mapped to a PDU session group ID. The PDU session group ID identifies a PDU session that is shared between several UEs that are assigned to the UE group ID. As all UEs within the group do not necessarily share the same PDU session having a particular PDU session group ID, there can be plural PDU session group IDs associated with a particular UE group context. According to embodiments, the PDU session context, which can be associated with a particular UE, can include information indicative PDU session information and a mapping between the PDU session ID with the associated UE group ID and PDU session group ID.

According to some embodiments, the UE group context includes information indicative of a list of UE IDs of each UE that is a member of the UE group, UE group related information which can include one or more of Quality of Service, charging policies and other US group related information. The UE group context can further includes information indicative of the shared PDU session context which can be identified by the shared PDU session ID that is generated by the SMF. In these embodiments, each UE has a UE context with includes a PDU session context and a shared PDU session context. In addition, the shared PDU session context includes a mapping of the PDU session ID generated by the UE with the UE group ID and the shared PDU session ID. According to these embodiments, the configuration of a UE group context and shared PDU session context can be applied to UEs, for example smart phones or other wireless devices, that have enhanced mobile broadband (eMBB) applications and massive IoT (MIoT) applications. In some instances these applications may occur at the same time.

According to some embodiments, the UE group context includes information that is indicative of the individual UE contexts of the UEs that have been assigned to the UE group, UE group related information which can include one or more of Quality of Service, charging policies and other US group related information. The UE group context can further include information indicative of the shared PDU session context which can be identified by the shared PDU session ID that is generated by the SMF. According to these embodiments, the configuration of a UE group context can be applied to UEs which relate to one or more applications, such as massive IoT (MIoT) applications.

According to embodiments, The UE context may include PDU session pointers pointing to memories of non-shared PDU sessions and shared PDU sessions. The PDU session pointers of multiple UE contexts can point to the same memory of shared PDU sessions. The (R)AN, UPF, AMF, SMF and other functions have a mapping of UE-generated PDU session ID and SMF-generated PDU session ID. The (R)AN, UPF, AMF and other functions may use the SMF address (such as IP address or FQDN) and shared PDU session ID to locate the data of shared PDU session. The SMF uses the shared PDU session ID to locate the context data of shared PDU sessions.

According to embodiments, one or more of the following parameters may be stored in the PDU session context of UE context at the SMF, AMF, UPF and (R)AN. The type of PDU session can be stored in the PDU session context, for example a non-shared PDU session or a shared PDU session. The PDU session ID may also be present in the PDU session context, for example for a non-shared PDU session, the PDU session ID can be UE-generated. For a shared PDU session, the PDU session ID can be UE-generated and SMF generated. The PDU session pointer may be stored in the PDU session context. For a non-shared PDU session, the PDU session pointer may point to a separate memory of PDU data structure. For a shared PDU session, the PDU session pointer may point to a common memory of PDU data structure. For example, the UE group ID and shared PDU session ID can uniquely identify the mapping between UE-generated session ID and SMF-generated shared PDU session ID. An example of a pointer can be a UE-generated PDU Session ID mapped to <UE Group ID, SMF-generated PDU Session ID>. The type of UP connection may be stored in the PDU session context, wherein the UP connection can be shared or non-shared. According to some embodiments, the PDU session context can include additional information elements, such as SMF ID (or SMF address) or AMF ID (or AMF address), depending on the network functions.

In additional to the individual UE context, the AMF, SMF, (R)AN, and UPF and other network functions may have a UE group context. The UE group context can include information elements that includes one or more of UE group ID, UE members, shared PDU session ID, serving SMF ID (or address), serving AMF ID (or address), S-NSSAI and the type of UP connection. The UE group ID can be unique in a PLMN, or unique within a network slice. The UE members can be list of UE IDs of the UE group. The shared PDU session ID can be the ID generated by the serving SMF and it can be unique within one UE group. The serving SMF can have a SMF ID (or address) and the serving AMF can have an AMF ID (or address). The S-NSSAI can represent network slice information and the UP connection type can be shared or non-shared.

According to embodiments, in the (R)AN, UPF, AMF, SMF and other network functions, a UE information may be stored in a separate UE context or in a UE group context or in a separate UE context and a UE group context. If the UE has a non-shared PDU session, the UE information may be stored in a separate UE context. If the UE belongs to a UE group, the UE information may be stored in a UE group context. The UE group context may include individual UE context profiles of all UEs in this group. Alternatively, the UE context profile may have pointers pointing to the UE group context profile.

According to some embodiments, when all UEs of a UE group have only shared PDU sessions, it is more efficient to have a single UE group context in UP and CP functions. The UE group context contains all individual UE information. When the 5G CP or UP functions want to make changes to all the UEs of the UE group, the UE group ID may be used to send messages to all the UE in the UE group. The UE group context includes the UE context of all of the member UEs. The UE group context can include a UE group ID which can be unique within one PLMN, or unique within a network slice instance; UE members, which can be a list of member UE IDs; UE context of each UE member which can include a security context, except for a shared PDU session context; shared PDU session contexts which can define the PDU sessions that are shared among UEs of the UE group; and policies applied to shared PDU sessions for example policies for individual UEs and for UE groups.

According to embodiments, when a control plane function or a user plane function are to transmit a message or signal for a UE group, the message or signal can include information that is indicative of the UE group ID and the shared PDU session ID. In this manner by sending a single message, the operation of plural UEs and their associated PDU sessions can be modified, thereby reducing the signalling that is required to make these changes to network operation.

However, in some embodiments, if a particular UE requests a modification to a PDU session associated therewith, and this PDU session is a shared PDU session, namely multiple UEs are using the same PDU session, the control network may reject this requested modification. For example, if a UE requests changes to certain control parameters of the PDU session, for example allocation and retention priority (ARP), maximum bit rate packet delay or other control parameters that can result in changes to the PDU session that would affect other UEs, the control network will reject the requested modification.

According to embodiments, the shared PDU session ID is generated by a control plane function, for example the SMF, which can be associated with a plurality of specific PDU sessions being used by multiple UEs and there is no change with respect to the UE. For example, a UE can request the establishment of a new PDU session which has a UE generated PDU session ID. The control plane function, for example the SM, can associate or map this UE generated PDU session ID with a SMF generated PDU session ID, for example a shared PDU session ID. It is understood that the shared PDU session ID can be unique within the particular SMF, unique within a plurality of SMFs associated with the communication network, or unique within a network slice instance, or unique with respect to PLMN network. Furthermore, it will be understood that while these embodiments have been discussed with respect to the SMF, the SMF may be replaced by another control plane function, for example the AMF, PCF, UDM, NEF or the like.

Figure 6:
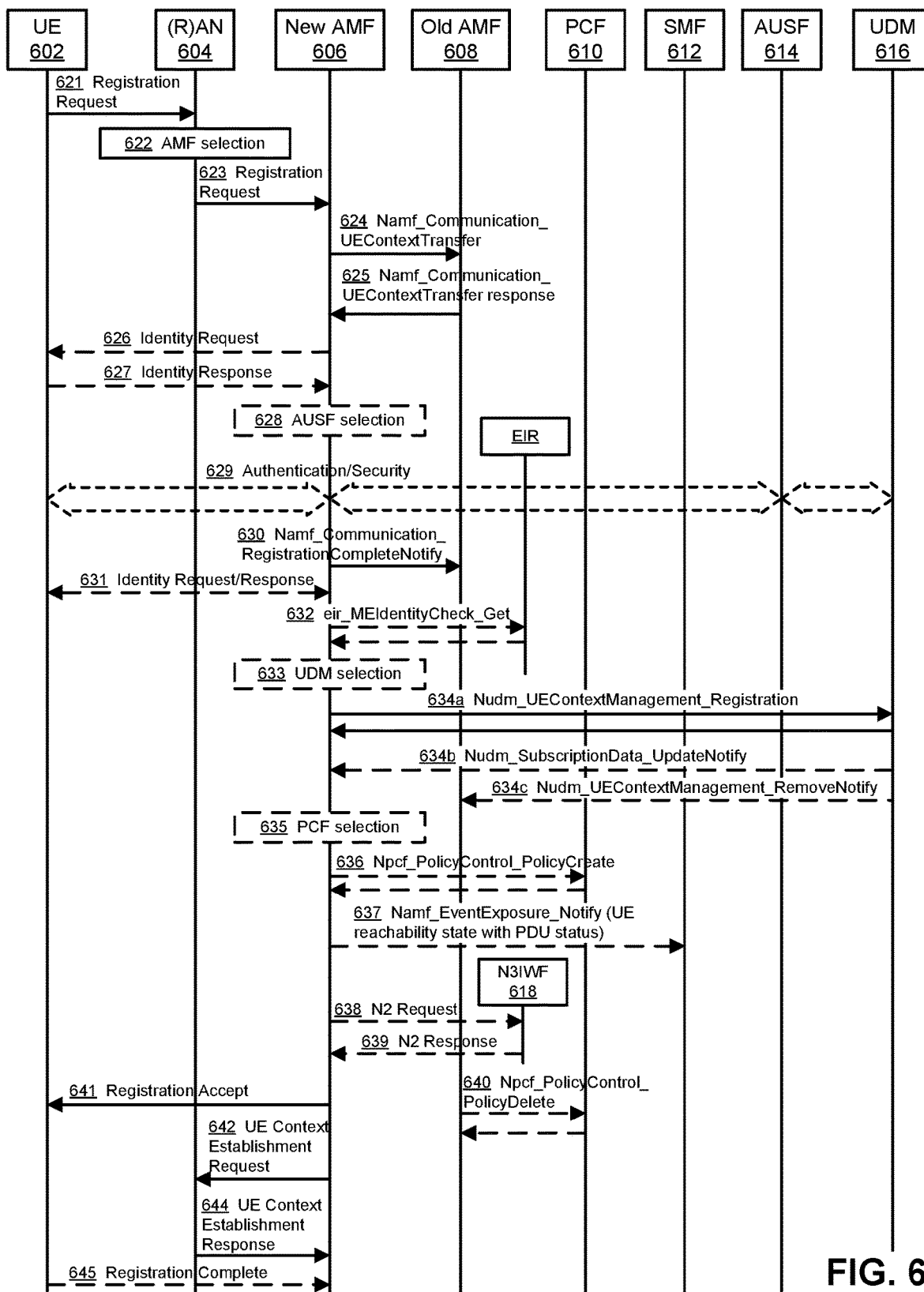
FIG. 6 illustrates a registration procedure of a UE with a (R)AN in accordance with embodiments of the present invention.

FIG. 6 illustrates a registration procedure of a UE with a (R)AN in accordance with embodiments of the present invention. According to embodiments, the procedure illustrated in FIG. 6 provides a method to create UE group context in the AMF when the first UE of a UE group registers to the CN. When the UE performs initial attachment, the UE may send device class to the (R)AN and the (R)AN can inform the AMF about UE device class. It is understood that device class may also be referred to as UE device class. The UDM provides UE group ID and UE IDs members. The PCF provides UE group policies. The AMF may request the (R)AN to create UE group context, which store the access and mobility policies of the UE group.

With reference to FIG. 6 the method includes the UE sending 621 a message in as a registration request to the (R)AN 604. The message can include (AN parameters, RM-NAS registration request (registration type, SUPI or 5G-GUTI, security parameters, NSSAI, UE 5GCN capability, PDU session status, PDU session(s) to be re-activated, UE device class, follow on request, and MICO mode preference)). In the case of 5G-RAN, the AN parameters can include e.g. SUPI or the 5G-GUTI, the selected network and NSSAI, UE device class. In case of NG-RAN, the AN parameters can also include establishment cause. The establishment cause provides the reason for requesting the establishment of an RRC connection. The registration type indicates if the UE wants to perform an "initial registration" (i.e. the UE is in RM-DEREGISTERED state), a "mobility registration update" (i.e. the UE is in registered state and initiates a registration procedure due to mobility) or a "periodic registration update" (i.e. the UE is in registered state and initiates a registration procedure due to the periodic update timer expiry). The UE can perform an initial registration (i.e., the UE is in RM-DEREGISTERED state) to a PLMN for which the UE does not already have a 5G-GUTI, the UE shall include its SUPI in the registration attempt. In other cases, the 5G-GUTI is included which indicates the last serving AMF. If the UE is already registered via a non-3GPP access in a PLMN different from the new PLMN (i.e. not the registered PLMN or an equivalent PLMN of the registered PLMN) of the 3GPP access, the UE may not provide over the 3GPP access the 5G-GUTI allocated by the AMF during the registration procedure over the non-3GPP access. Also, if the UE is already registered via a 3GPP access in a PLMN (i.e. the registered PLMN), different from the new PLMN (i.e. not the registered PLMN or an equivalent PLMN of the registered PLMN) of the non-3GPP access, the UE will not provide over the non-3GPP access the 5G-GUTI allocated by the AMF during the registration procedure over the 3GPP access. The security parameters are used for authentication and integrity protection. NSSAI indicates the network slice selection assistance information. The PDU session status indicates the previously established PDU sessions in the UE. The PDU session(s) to be re-activated is included to indicate the PDU session(s) that the UE intends to activate. The follow on request is included when the UE has pending uplink signalling and the UE doesn't include PDU session(s) to be re-activated. The UE device class can be optional and it indicates the UE capabilities to assist (R)AN to select a pre-configured AMF. The UE device class is also to assist so that the AMF to select a pre-configured SMF function or NSSF function.

If a SUPI is included or the 5G-GUTI does not indicate a valid AMF the (R)AN, based on (R)AT and NSSAI and/or UE device class, if available, selects an AMF 622. The process by which the (R)AN selects an AMF can proceed as is known. If the (R)AN cannot select an appropriate AMF, it forwards the registration request to an AMF which has been configured, in (R)AN, to perform AMF selection. In some embodiments, the NMF may preconfigure the UE group information in the (R)AN 604 with the following information: UE group ID, UE IDs of UE group, network slice information (e.g. S-NSSAI) and a default or pre-configured AMF that is dedicated to serve the UE group. If the (R)AN 604 receives the information from the UE in message 621 that matches the UE group information, the (R)AN 604 can select the pre-configured AMF to serve the UE 602.

The (R)AN 604 sends 623 a message as a registration request to the new AMF 606. The message can include (N2 parameters, RM-NAS registration request (registration type, subscriber permanent identifier or 5G-GUTI, security parameters, NSSAI and MICO mode preference, UE device class)). When 5G-RAN is used, the N2 parameters include the location information, cell identity and the RAT type related to the cell in which the UE is camping. When NG-RAN is used, the N2 parameters also include the establishment cause. The message in 623 may include UE group information (such as UE group ID). If the registration type indicated by the UE is periodic registration update, then steps 624 to 637, referred to below, may be omitted.

In some embodiments, the new AMF 606 sends 624 a message as a UE context transfer request to the old AMF 608. The message can be a Namf_Communication_UE_Context_Transfer (complete registration request). If the UE's 5G-GUTI was included in the registration request and the serving AMF has changed since last registration, the new AMF may invoke the Namf_Communication_UEContextTransfer service operation on the old AMF including the complete registration request IE, which may be integrity protected, to request the UE's SUPI and MM Context. The old AMF uses the integrity protected complete registration request IE to verify if the context transfer service operation invocation corresponds to the UE requested. The old AMF also transfers the event subscriptions information by each consumer NF, for the UE, to the new AMF. Subsequently, the old AMF 608 sends 625 a UE context transfer response which can be a response to Namf_Communication_UEContextTransfer which can include (SUPI, MM Context, SMF information). The old AMF can respond to the new AMF for the Namf_Communication_UEContextTransfer invocation by including the UE's SUPI and MM context. If the old AMF holds information about active PDU sessions, the old AMF includes SMF information including SMF identities and PDU session identities. If the old AMF holds information about active N2AP UE-TNLA bindings to N3IWF, the old AMF includes information about the N2AP UE-TNLA bindings.

In some embodiments, the new AMF 606 sends 626 an identity request to the UE 602. If the SUPI is not provided by the UE nor retrieved from the old AMF the identity request procedure is initiated by AMF sending an identity request message to the UE. The UE 602 may send 627 an identity response to the new AMF wherein the identity response can include the SUPI. In some embodiments, the AMF 606 may decide to invoke an AUSF 628, wherein the AMF, based on SUPI, can select an AUSF as is known. The AUSF may initiate authentication 629 of the UE. If network slicing is used, the AMF can decide if the registration request needs to be rerouted. The AMF can also initiate NAS security functions.

In some embodiments, new AMF 606 sends 630 a message to the old AMF 608 wherein the message is a Namf_Communication_RegistrationCompleteNotify ( ). If the AMF has changed the new AMF notifies the old AMF that the registration of the UE in the new AMF is completed by invoking the Namf_Communication_RegistrationCompleteNotify service operation. If the authentication/security procedure fails, then the Registration shall be rejected, and the new AMF invokes the Namf_Communication_RegistrationCompleteNotify service operation with a reject indication reason code towards the old AMF. The old AMF continues as if the UE context transfer service operation was never received. In some embodiments, the new AMF 606 sends 631 an identity request to the UE 602. If the PEI was not provided by the UE nor retrieved from the old AMF the identity request procedure is initiated by AMF sending an identity request message to the UE to retrieve the PEI.

In some embodiments, the new AMF 606, based on the SUPI or UE device class or both, selects 633 a UDM 616. If the AMF 606 knows that the UE belongs to a UE group, the AMF 606 may select the same UDM 616 that serves other UEs of the same UE group. If the AMF has changed since the last registration, or if the UE provides a SUPI which doesn't refer to a valid context in the AMF, or if the UE registers to the same AMF it has already registered to a non-3GPP access (i.e. the UE is registered over a non-3GPP access and initiates this registration procedure to add a 3GPP access), the new AMF 606 invokes 634a the Nudm_UEContextManagement_Registration service operation towards the UDM 616. If there is no subscription context for the UE in the AMF, the "subscription data retrieval indication" is included. The new AMF provides the access type it serves for the UE to the UDM and the access type is set to "3GPP access". The UDM stores the associated access type together with the serving AMF. For the other UEs of the UE Group, the AMF does not need to obtain the UE Context information if there are no changes to the UE group subscription. If "the subscription data retrieval" indication was included in step 634a, the UDM invokes 634b the Nudm_SubscriptionData_UpdateNotification service operation to provide the subscription data from the UDM. The new AMF creates an MM context for the UE after getting the mobility related subscription data from the UDM. The subscription data may include UE device class and UE group information. The UE group information include UE group ID, UE IDs of the UE group (e.g. SUPI). The UE group ID indicates that the UEs of the same UE group ID have the same network control policies, such as access, mobility, QoS policies. If the UE group Context does not exist, the AMF creates the UE group context for the UE group. When the UDM 616 stores the associated access type together with the serving AMF as indicated in step 634a, it will cause the UDM to initiate 634c a Nudm_UEContextManagement_RemoveNotification to the old AMF 608 corresponding to 3GPP access, if one exists. The old AMF removes the MM context of the UE. If the serving NF removal reason indicated by the UDM is "initial registration", then the old AMF invokes the Namf_EventExposure_Notify service operation towards all the associated SMFs of the UE to notify that the UE is de-registered from old AMF. The SMF shall release the PDU session(s) on getting this notification.

In some embodiments, the new AMF 606, based on the SUPI, selects a PCF in 635. If the AMF 606 knows that the UE belongs to a UE group, the AMF 606 may select the same PCF 610 that has been selected (or pre-configured) to serve the UEs of the UE group. The new AMF 606 sends 636 a message to the PCF 610, wherein the message is a Npcf_PolicyControl_PolicyCreate (SUPI). If the AMF has not yet obtained access and mobility policy for the UE or if the access and mobility policy in the AMF are no longer valid, the AMF requests the PCF to apply operator policies for the UE by creating a policy control session with the PCF through the Npcf_PolicyControl_PolicyCreate service operation. In the roaming case, the interaction between H-PCF and V-PCF is required for the provision of the access and mobility policy. The PCF sends a response to the new AMF wherein the response is a Npcf_PolicyControl_PolicyCreate (access and mobility policy data). The PCF responds to the Npcf_PolicyControl_PolicyCreate service operation and provides the access and mobility policy data for the UE to the AMF.

In some embodiments, new AMF sends a message to the SMF wherein the message is a Namf_EventExposure_Notify ( ). The AMF invokes the Namf_EventExposure_Notify in one or more of situations: 1) If the AMF is changed, the new AMF notifies each SMF of the new AMF serving the UE by informing the UE reachability status including the PDU session status from the UE relevant for each SMF. In case the AMF has changed, it is assumed that the old AMF provides the available SMF information. Based on the PDU session status provided by the new AMF checks the PDU session status and in the Namf_EventExposure_Notify service operation the SMF either re-activates the PDU sessions by to complete the user plane(s) setup without sending MM NAS service accept from the AMF to (R)AN or releases any network resources related to PDU sessions that the UE indicated as not established; and 2) If the UE was in MICO mode and the AMF had notified an SMF of the UE being unreachable and that the SMF does not need to send DL data notifications to the AMF, the AMF informs the SMF that the UE is reachable; and 3) If the AMF had notified an SMF of the UE being reachable only for regulatory prioritized service and the UE enters into allowed area, the AMF informs the SMF that the UE is reachable. According to embodiments, the AMF will also notify any other NF that subscribed to UE reachability that the UE is reachable. According to embodiments, if an SMF has subscribed to UE location change notification via Namf_EventExposure_Subscribe service operation and if the AMF detects that the UE has moved out the area of interest subscribed by an SMF serving the UE, the AMF invokes Namf_EventExposure_Notify service operation to inform the SMF of the new location information of the UE. According to embodiments, the SMF may decide to trigger, for example new intermediate UPF insertion or UPF relocation. According to embodiments, if the registration type indicated by the UE is periodic registration update, then steps 640 and 641 may be omitted.

According to embodiments, the new AMF sends 638 a N2 Request( ) to N3IWF 618. The AMF may decide to modify the N2AP UE-TNLA-binding toward N3IWF. This is done in case AMF is changed and old AMF have existing N2AP UE-TNLA-bindings toward a N3IWF for the UE. The N3IWF 618 can send 639 a N2 Response( ) to the new AMF 606.

In some embodiments, the old AMF 608 sends 640 Npcf_PolicyControl_PolicyDelete ( ) to the PCF 610. If the old AMF previously requested UE context to be established in the PCF, the old AMF terminates the UE context in the PCF by invoking the Npcf_PolicyControl_PolicyDelete service operation. The PCF 610 can send a Npcf_PolicyControl_PolicyDelete ( ) response to old AMF 608.

According to embodiments, the new AMF 606 sends 641 a registration accept message to the UE 602. The message can include (5G-GUTI, registration area. mobility restrictions, PDU session status, NSSAI, periodic registration update timer, LADN information and accepted MICO mode, UE group information (e.g. UE group ID, application ID)). The AMF sends a registration accept message to the UE indicating that the registration has been accepted. 5G-GUTI is included if the AMF allocates a new 5G-GUTI. Mobility restrictions included in case mobility restrictions applies for the UE. The AMF indicates the established PDU sessions to the UE in the PDU session status. The UE removes locally any internal resources related to PDU sessions that are not marked as established in the received PDU session status and for which the UE has requested PDU session establishment and not received SMF response. If the PDU session status information was in the registration request, the AMF shall indicate the PDU session status to the UE. The NSSAI includes the allowed S-NSSAIs. If the UE subscription data includes subscribed LADN identification information, the AMF can include in the registration accept message the LADN Information for LADNs that are available within the registration area determined by the AMF for the UE. If the UE included a MICO mode in the request, then AMF responds whether MICO mode should be used. When the follow on request is included, the AMF can not release the signalling connection immediately after the completion of the registration procedure.

In some embodiments, the AMF 606 sends 642 to the (R)AN 604 a message to establish UE context. The message includes UE device class, 5G GUTI, S-NSSAI, UE group context information (UE group ID, UE IDs of UE group, application ID, UE group access and mobility policies), security information. If the UE group context has been created by shared PDU session pre-configuration procedure, the (R)AN associates the UE with the group UE context. The UE group context may contain a pre-configured N3 shared tunnel. If the UE group context does not exist, the AMF may send to the (R)AN UE group context information, including UE group access and mobility policies. The AMF may include the list of UEs (including SUPI of UEs) of the same UE group ID. The AMF may also include security information to the (R)AN. The (R)AN 604 sends 643 a response message to the AMF 606. If the UE group context does not exist, the (R)AN may create DL TEID and send (R)AN tunnel information to the AMF.

In some embodiments, the UE 602 sends 644 a registration complete message to the AMF 606. The UE sends a registration complete message to the AMF to acknowledge if a new 5G-GUTI was assigned. When the "PDU session(s) to be re-activated" are not included in the registration request, the AMF releases the signalling connection with the UE. When the follow on request is included in the registration request, the AMF can not release the signalling connection immediately after the completion of the registration procedure.

Figure 7:
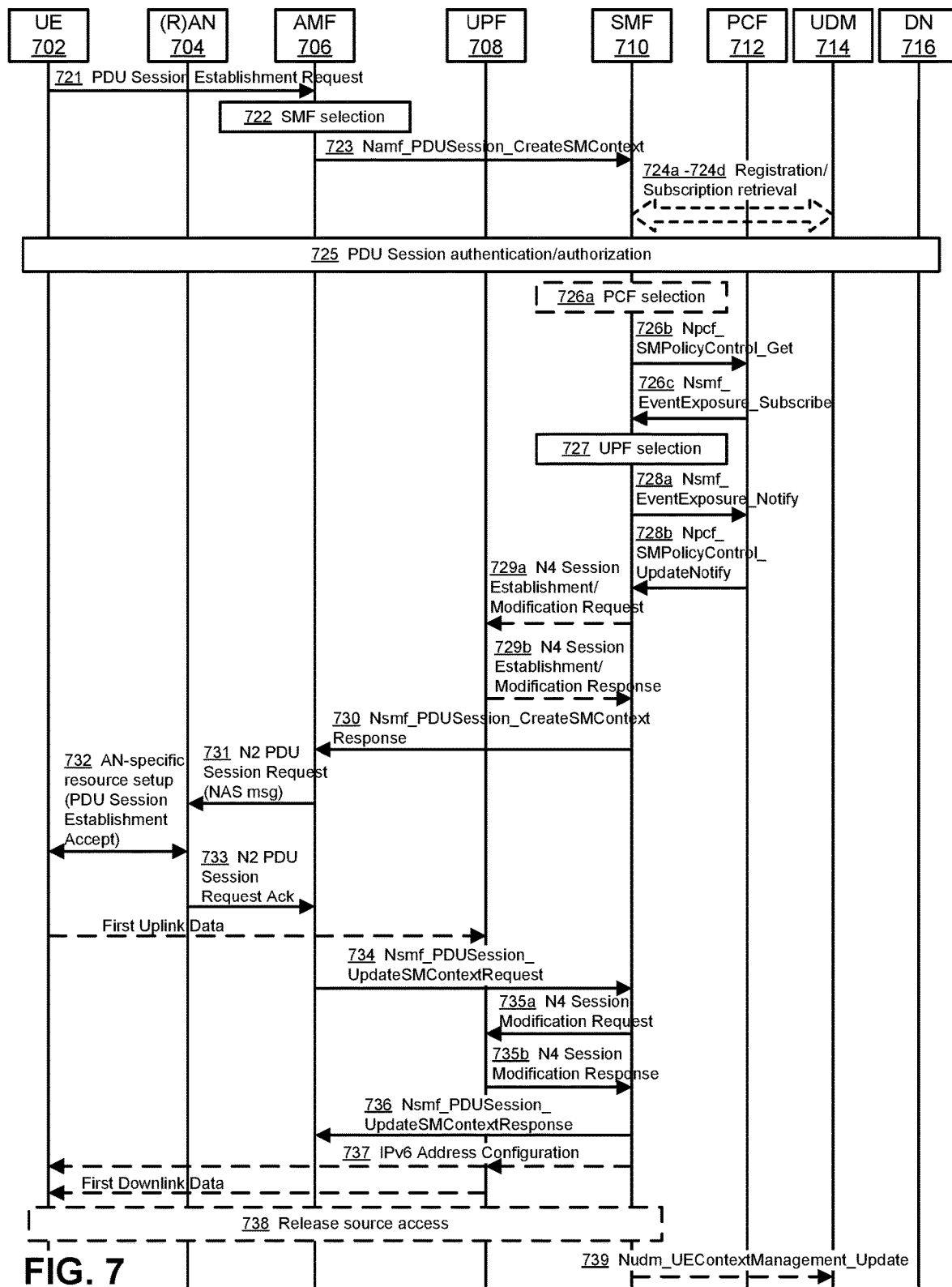
FIG. 7 illustrates a UE-requested PDU session establishment for non-roaming and roaming with local breakout in accordance with embodiments of the present invention.

FIG. 7 illustrates a UE-requested PDU session establishment for non-roaming and roaming with local breakout in accordance with embodiments of the present invention. According to embodiments, there is provided methods to create UE group context in SMF and UPF functions. In these embodiments, the shared PDU session is not pre-configured. The UE sends a request to the SMF to establish a PDU session after successful registration. The AMF and SMF create shared PDU session context when receiving the PDU session establishment request from the first UE of the UE group ID. FIG. 7 illustrates a method used to establish a new PDU session as well as to hand over an existing PDU Session between 3GPP access and non-3GPP access. In case of roaming, the AMF determines if a PDU session is to be established in local breakout (LBO) or home routing. In the case of LBO, the procedure is as in the case of non-roaming, however the SMF, UPF and PCF are located within the visited network.

With further reference to FIG. 7, there is an assumption that the UE has already registered on the AMF thus the AMF has already retrieved the user subscription data from the UDM. The UE 702 sends 721 a PDU session establishment request to the AMF 706. The UE can send a NAS message which includes (S-NSSAI, DNN, PDU session ID, request type, N1 SM information, UE device class, UE group information (UE group ID, application ID)). The UE group information (UE group ID, application ID) may be included if the UE knows its UE group ID and application ID. In order to establish a new PDU session, the UE generates a new PDU session ID. The UE initiates the UE requested PDU session establishment procedure by the transmission of a NAS message containing a PDU session establishment request within the N1 SM information. The PDU session establishment request may include a PDU type, SSC mode, protocol configuration options. The request type indicates "initial request" if the PDU session establishment is a request to establish a new PDU session and indicates "existing PDU session" if the request refers to an existing PDU session between 3GPP access and non-3GPP access. The request type indicates "emergency request" if the PDU session establishment is a request to establish a PDU session for emergency bearer services. The request type indicates "existing emergency PDU session" if the request refers to an existing PDU session for emergency services between 3GPP access and non-3GPP access. The NAS message sent by the UE can be encapsulated by the AN in a N2 message towards the AMF that should include user location information and access technology type information. The N1 SM information may contain SM PDU DN request container containing information for the PDU session authorization by the external DN. The AMF receives from the AN, the NAS SM message (built in step 721) together with user location information (e.g. cell ID in case of the RAN). The UE shall not trigger a PDU session establishment for a PDU session corresponding to a LADN when the UE is outside the area of availability of the LADN. The UE device class is optional. The UE can provide UE device class, which may also be referred to as device class, so that the AMF can select a SMF and suitable methods to assign IP address/IP prefix, policy, QoS, UP management procedures. If the device class is sent from the UE, for some device classes, one or more of the following pieces of information may be omitted, DNN, S-NSSAI, PDU Session ID. If the AMF knows the device class, which has been provided by either the UE or the UDM, the device class may be omitted.

According to embodiments, the AMF 706 determines that the message corresponds to a request for a new PDU session based on that request type indicates "initial request" and that the PDU session ID that is not used for any existing PDU session(s) of the UE. If the NAS message does not contain an S-NSSAI, the AMF may determine a default S-NSSAI for the requested PDU session either according to the UE subscription, if it contains only one default S-NSSAI, or based on the operator policy. The AMF selects 722 a SMF. The AMF stores an association of the PDU session ID and the SMF ID. The case where the request type indicates "existing PDU session", and either the AMF does not recognize the PDU session ID or the subscription context from UDM does not contain an SMF ID corresponding to the DNN constitutes an error case. If the request type indicates "emergency request" or "existing emergency PDU session", the AMF selects the SMF taking this type of request into account. Based on one or more of the S-NSSAI, device class and UE group ID, the AMF selects a SMF to serve the UE. The AMF 706 may select the same SMF that has been pre-configured in the AMF or in the NRF, or has been selected to serve other UEs of the UE group.

According to embodiments, the AMF 706 sends 723 a Nsmf_PDUSession_CreateSMRequest which can include (SUPI, DNN, S-NSSAI, PDU session ID, AMF ID, request type, device class, UE group ID, existing shared PDU session IDs, N1 SM information (PDU session establishment request), user location information, access technology type, PEI, PCF ID, UE group information (e.g. UE) to the SMF 710. The PCF ID is the ID of the PCF that has been selected by the AMF 706 to serve the UE or to serve all the UEs of UE group. The AMF ID uniquely identifies the AMF serving the UE. The AMF forwards the PDU session ID together with the N1 SM information containing the PDU session establishment request received from the UE. The device class may be optional. The SMF may obtain device class later when accessing UDM. Based on one or more of S-NSSAI, device class, and DNN, the AMF may select an UE group ID and include existing shared PDU session IDs of this UE group. The UE group ID(s) indicates that the UE belongs to a UE group. If the SMF already obtained UE subscription data, session management, QoS, and charging policies for the UE group ID, the SMF may not need to access the either the UDM or PCF to get the UE information.

In some embodiments, if the SMF has not yet registered and subscription data is not available, then the SMF 710 registers 724a-724b with the UDM 714, retrieves subscription data and subscribes to be notified when subscription data is modified. If the request type indicates "existing PDU session" the SMF determines that the request is due to handover between 3GPP access and non-3GPP access. The SMF identifies the existing PDU session based on the PDU session ID. subscription data includes the authorized PDU type(s), authorized SSC mode(s), default 5QI/ARP, subscribed session-AMBR, UE group ID, UE group AMBR. The SMF checks whether the UE request is compliant with the user subscription and with local policies. If the DNN corresponds to an LADN, the SMF verifies whether the UE is located within the LADN service area based on the UE location reporting from the AMF. If that is not the case the SMF rejects the UE request via NAS SM signalling by responding to the AMF with Nsmf_PDUSession_CreateSM-Response including a relevant SM rejection cause. The SMF indicates to the AMF that the PDU session ID is to be considered as released, it deregisters from UDM and the rest of the method is skipped. The UE group AMBR is the aggregated maximum bit rate of the UE group ID. The group AMBR is enforced by the (R)AN and UPF. If the UE belongs to a UE group and the SMF already has subscription data for the UE group ID, the SMF does not need to perform this registration with the UDM. If the UE is the first UE of a UE group, the SMF obtains UE subscription data, UE group data from the UDM and stores this information in the UE group shared session context. The SMF may create a shared PDU session ID as part of UE group shared PDU session context. The SMF stores the mapping between the shared PDU session ID and UE-generated PDU session IDs.

According to some embodiments, the UDM 714 may inform the SMF 710 about the PCF 712, which has been selected by the AMF 706 to serve the UE.

According to embodiments, if the SMF needs to perform secondary authorization/authentication 725 during the establishment of the PDU session by a DN-AAA server, the SMF selects an UPF and triggers the PDU session establishment authentication/authorization. If the PDU session establishment authentication/authorization fails, the SMF terminates the PDU session establishment procedure and indicates a rejection to the UE. The secondary authorization/authentication may be applied to individual UEs of the same UE group ID.

According to embodiments, if dynamic PCC is deployed, the SMF 710 performs PCF selection 726a. The SMF may select the same PCF that can be defined either by the AMF 706 in message 723 or defined by the UDM 714 in step 724. If dynamic PCC is not deployed, the SMF may apply local policy. The SMF may use one or both of UE group ID and device class to select a PCF. The SMF 710 may invoke 726b the Npcf_SMPolicyControl_Get operation to establish a PDU-CAN session with the PCF 712 and get the default PCC rules for the PDU session. If the request type indicates "existing PDU session", the SMF may notify an event previously subscribed by the PCF by invoking the Nsmf_EventExposure_Notify operation and the PCF may update policy information in the SMF by invoking Npcf_SMPolicyControl_UpdateNotify operation. The PCF may provide authorized session-AMBR and the authorized 5QI/ARP to SMF. If the UE belongs to a UE group and this UE is the first UE requesting PDU session establishment, the SMF establishes a PDU-CAN shared session with the PCF and gets the default PCC rules for the PDU shared session. The PCC rules include the rules for individual UE and the rules for the UE group. The PCF 712 subscribes to the IP allocation/release event in the SMF 710 (and may subscribe other events) by invoking 726c the Nsmf_EventExposure_Subscribe operation. A purpose of steps 726a-726c is to receive PCC rules before selecting UPF. If PCC rules are not needed as input for UPF selection, these steps can be skipped. For unstructured PDU session, the PCF may subscribe to the IP allocation/release event of N6 UPD/IP interface.

According to embodiments, if the request type indicates "initial request", the SMF selects an SSC mode for the PDU session. If step 725 is not performed, the SMF 710 also selects 727 an UPF. In case of PDU type IPv4 or IPv6, the SMF allocates an IP address/prefix for the PDU session. For unstructured PDU type the SMF may allocate an IPv6 prefix for the PDU session and N6 point-to-point tunnelling (based on UDP/IPv6). If the request type indicates "emergency request" or "existing emergency PDU session", the SMF selects the UPF in accordance with the request type. For the first UE of a UE group ID requesting PDU session establishment, the SMF may allocate an IP address or IP prefix for the PDU session and N6 IP/UDP point-to-point tunnel. The SMF may also assign a flow label of N6 IP/UDP tunnel. For other UEs of the same UE group ID requesting PDU, the SMF may allocate a new IP address or IP prefix for the PDU session and N6 IP/UDP point-to-point tunnel. Alternatively, the SMF may use the same IP address/IP prefix for N6 IP/UDP tunnel, but assign another flow label for the N6 IP/UDP tunnel for the PDU session for each UE. The SMF may select whether a shared UL and DL UP connections based on UE mobility information received from AMF, QoS and charging policies, and legal interception requirements. The following combinations of N3 and N9, and N6 tunnels are possible, but not limited to: 1) UL and DL N3 and N9 tunnels are shared; 2) UL N3 and N9 tunnels are shared and the DL N3 and N9 tunnels are not shared; 3) N6 tunnel is shared or not shared.

According to some embodiments, the SMF 710 may select the same UPF 708 to serve the UEs of the UE group. If an intermediate UPF (I-UPF) (not shown in FIG. 7) is required to provide connection between the (R)AN 704 and the PDU session anchor (PSA) UPF, the SMF 710 may select the same I-UPF to serve the UEs that are in the service area of the I-UPF or in the service area of the PSA UPF 708.

According to embodiments, the SMF 710 may invoke 728a the Nsmf_EventExposure_Notify service operation to report some event to the PCF that has previously subscribed. If request type is "initial request" and dynamic PCC is deployed and PDU type is IPv4 or IPv6, SMF notifies the PCF (that has previously subscribed) with the allocated UE IP address/prefix. The PCF may provide authorized session-AMBR and the authorized 5QI/ARP to SMF. For the UE group, the SMF may notify the PCF the IP address or IP prefix of the UE and/or IP address/IP prefix of the N6 IP/UDP tunnel. The PCF has a mapping of IP address of IP prefix of UEs of the same UE group. The PCF 712 may provide updated policies to the SMF by invoking 728b the Npcf_SMPolicyControl_UpdateNotify service operation. For the UE group, if the PCF has already provided SMF with PCC rules for individual UEs and UE group, this step may be skipped. The PCF may use the UE group ID to send one message to the SMF to modify PCC rules for all UEs of the same UE group.

According to embodiments, if request type indicates "initial request" and step 725 was not performed, the SMF initiates an N4 session establishment procedure with the selected UPF, otherwise it initiates an N4 session modification procedure with the selected UPF. The SMF 710 sends 729a a N4 session establishment/modification request to the UPF and provides packet detection, enforcement and reporting rules to be installed on the UPF 708 for this PDU session. If CN tunnel information is allocated by the SMF, the CN tunnel information is provided to UPF in this step. If UE belongs to a UE group, the CN tunnel information may be already established for the UE group ID. The SMF sends and N4 session modification request to the UPF. The message includes the UE group ID, shared PDU session ID, UL TEID, DL TEID. If the UE belongs to a UE group and the CN tunnel is not established, the SMF sends an N4 Session establishment to the SMF. The message includes UE group ID, list of UE (indicated by e.g. SUPI) in the UE group, and PCC rules for individual UE and UE group. The SMF may include the DL TEID if the SMF knows the existing shared DL N3 tunnel. Otherwise, the (R)AN may generate a new DL TEID at a later point. The SMF may include a UL TEID. The UL TEID may belong to an existing shared N3 tunnel or a new non-shared N3 tunnel. The UPF 708 acknowledges by sending 729b an N4 session establishment/modification response. If CN tunnel information is allocated by the UPF, the CN tunnel information is provided to SMF in this step.

According to some embodiments, the SMF 710 may assign the same tunnel endpoint ID (TEID) for the shared N3 and N9 tunnels in the UL. If the (R)AN assigns the DL N3 TEID, the SMF may assign the same TEID for DL N9 TEID as DL N3 TEID. The (R)AN 704 and UPF 708 may perform packet aggregation to send aggregated PDUs in the UL and DL N3 and N9 shared tunnels.

According to some embodiments, if the PDU session of the UE has non-shared N3 and N9 tunnels, the SMF 710 may assign the same TEID for the non-shared UL N3 and UL N9 tunnels. The (R)AN 704 may assign the TEID for the DL N3 tunnel, the SMF may use the same DL N3 TEID for the DL N9 TEID.

According to embodiments, the SMF 710 sends 731 a Nsmf_PDUSession_CreateSM response which can include (cause, N2 SM information (PDU session ID, QoS profile(s), CN tunnel information, S-NSSAI, session-AMBR, UE group ID, group-QoS profile(s), PDU shared session ID, DL TEID), N1 SM information (PDU session establishment accept (authorized QoS rule, SSC mode, S-NSSAI, allocated IPv4 address, session-AMBR))) to the AMF 706. The N2 SM information carries information that the AMF shall forward to the (R)AN can include one or more of the CN tunnel information corresponds to the core network address of the N3 tunnel corresponding to the PDU session, the QoS profile provides the (R)AN with the mapping between QoS parameters and QoS flow identifiers. multiple QoS profiles can be provided to the (R)AN, the PDU session ID may be used by AN signalling with the UE to indicate to the UE the association between AN resources and a PDU session for the UE, the S-NSSAI is corresponding to the PDU session, the N1 SM information contains the PDU session establishment accept that the AMF shall provide to the UE, and the multiple authorized QoS rules may be included in the PDU session establishment accept within the N1 SM information and in the N2 SM information, the SM response further contains PDU session ID and information allowing the AMF to know which the target UE as well to determine which access towards the UE to use. It is understood that the access information is to deal with the case where a UE is simultaneously connected over 3GPP and non 3GPP access. The SMF shall subscribe to the UE location reporting in case of successful PDU session establishment providing reporting criteria (e.g. UE location with respect to the area of LADN availability for a LADN). If the UE PDU session belongs to a PDU shared session, the SMF includes UE group ID and/or PDU shared session ID. If the UE is the first UE of a UE group requesting PDU session establishment, the SMF also includes group QoS profile(s).

For other UEs of the same UE group ID and PDU shared session ID, the group QoS profile(s) may be also include the DL TEID is included if the N3 tunnel is shared. The DL TEID is the TEID of the existing shared N3 tunnel. In addition, for some device classes, the SMF may not send one or more of the following to the UE in the NAS message: authorized QoS rule, SSC mode, S-NSSAI, allocated IPv4 address, session-AMBR.

According to embodiments, the AMF 706 sends 731 a N2 PDU session request which can include (N2 SM information, NAS message (PDU session ID, PDU session establishment accept)), to the (R)AN 704. The AMF sends the NAS message containing PDU session ID and PDU session establishment accept targeted to the UE and the N2 SM information received from the SMF within the N2 PDU session request to the (R)AN. The (R)AN 704 may issue 732 an AN specific signalling exchange with the UE 702 that is related with the information received from SMF. For example, in case of a 3GPP RAN, an RRC connection reconfiguration may take place with the UE establishing the necessary RAN resources related to the authorized QoS rules for the PDU session request received in step 730. (R)AN also allocates (R)AN N3 tunnel information for the PDU session. In case of dual connectivity, the master RAN node may assign some (zero or more) QFIs to be setup to a master RAN node and others to secondary RAN node. The RAN tunnel information includes a tunnel endpoint for each involved RAN node, and the QFIs assigned to each tunnel endpoint. A QFI can be assigned to either the master RAN node or the secondary RAN node and not to both. (R)AN forwards the NAS message (PDU session ID, N1 SM information (PDU session establishment accept)) provided in step 730 to the UE. (R)AN can provide the NAS message to the UE if the necessary RAN resources are established and the allocation of (R)AN tunnel information are successful.

According to embodiments, the (R)AN 704 sends 733 a N2 PDU session response which can include (PDU session ID, cause, N2 SM information (PDU session ID, (R)AN tunnel information, list of accepted/rejected QoS profile(s))) to the AMF 706. The (R)AN tunnel information corresponds to the access network address of the N3 tunnel corresponding to the PDU session. The UE may be assigned a separate N3 tunnel or a shared N3 tunnel. If the SMF has not indicated shared DL TEID in step 730, the (R)AN may include a DL TEID in the (R)AN tunnel information. If UE belongs to a UE group ID and the (R)AN shared N3 tunnel for this UE group has been established, the N2 SM information may be omitted.

According to embodiments, the AMF 706 sends 734 a Nsmf_PDUSession_UpdateSMContext request (N2 SM information) to the SMF 710. The AMF forwards the N2 SM information received from (R)AN to the SMF. If the UE PDU session belongs to a PDU shared session ID and the SMF already has the (R)AN N3 shared tunnel information, this step may be skipped. If the N4 session for this PDU session was not established already, the SMF initiates an N4 session establishment procedure with the UPF. Otherwise, the SMF initiates an N4 session modification procedure with the UPF. The SMF provides AN tunnel information and CN tunnel information. The CN tunnel information only needs to be provided if the SMF selected CN tunnel information. If the PDU session establishment request was due to mobility between 3GPP and non-3GPP access, the downlink data path is switched towards the target access in this step. If the UE PDU session belongs to a PDU shared session and the SMF already notified UPF about (R)AN N3 shared tunnel information, this step and step 735b may be skipped. The UPF 708 provides 735b a N4 session establishment/modification response to the SMF.

According to some embodiments, the SMF 710 may assign the same tunnel endpoint ID (TEID) for the shared N3 and N9 tunnels in the UL. If the (R)AN assigns the DL N3 TEID, the SMF may assign the same TEID for DL N9 TEID as DL N3 TEID. The (R)AN 704 and UPF 708 may perform packet aggregation to send aggregated PDUs in the UL and DL N3 and N9 shared tunnels.

According to some embodiments, if the PDU session of the UE has non-shared N3 and N9 tunnels, the SMF 710 may assign the same TEID for the non-shared UL N3 and UL N9 tunnels. The (R)AN 704 may assign the TEID for the DL N3 tunnel, the SMF may use the same DL N3 TEID for the DL N9 TEID.

According to embodiments, the SMF 710 sends 736 a Nsmf_PDUSession_UpdateSMContext response (cause) to the AMF 706. After this step, the AMF forwards relevant events to the SMF, e.g. at handover where the (R)AN tunnel information changes or the AMF is relocated. In addition, if step 734 is skipped then step 736 is also skipped. In some embodiments, in the case of a PDU type IPv6, the SMF 710 generates an IPv6 router advertisement and sends it to the UE 702 via the UPF 708.

According to embodiments, if the PDU session establishment request is due to a handover between 3GPP access and non-3GPP access, i.e. the request type is set to "existing PDU session" the SMF 710 performs steps in order to release 738 the user-plane over the source access (3GPP or non-3GPP access). If the SMF identity is not included in the DNN subscription context, either stored already in SMF if it was previously registered or provided in steps 724a-724b by the UDM, the SMF 710 invokes 739 the Nudm_UEContextManagement_Update service operation including the SMF address, the DNN and the PDU Session Id. The UDM stores the SMF identity, SMF address and the associated DNN and PDU Session Id.

According to embodiments, if during the procedure the PDU session establishment is not successful, the SMF informs the AMF. Once the AMF associates an SMF with a PDU session ID, the SMF is automatically subscribed to notifications of incoming N1 signalling associated with this PDU session ID. These notifications automatically provide any user location information and Access Type that the AMF has received from the (R)AN in association with N1 signalling.

Figure 8:
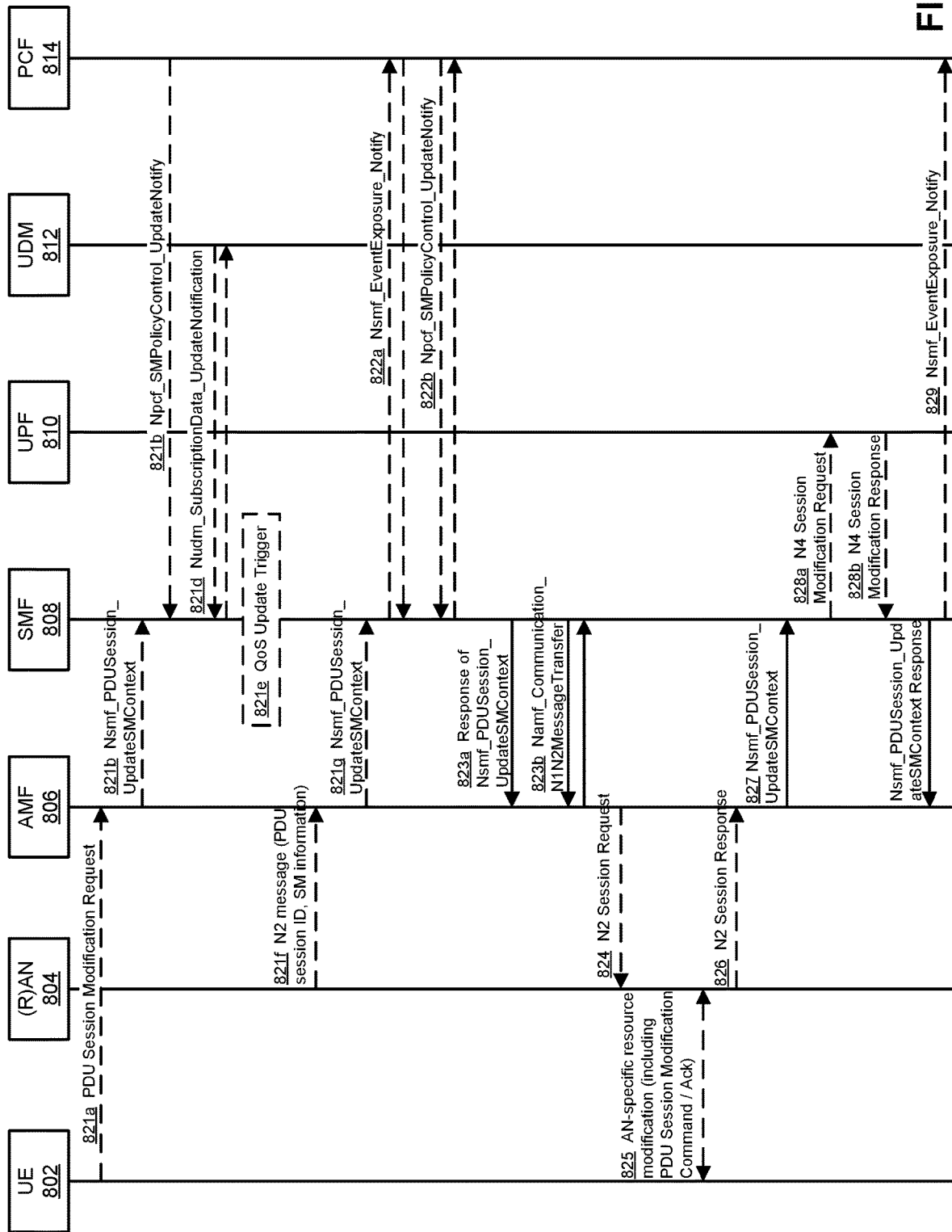
FIG. 8 illustrates UE or network requested PDU session modification for non-roaming and roaming with local breakout in accordance with embodiments of the present invention.

FIG. 8 illustrates UE or network requested PDU session modification for non-roaming and roaming with local breakout in accordance with embodiments of the present invention. The UE 802 initiates the PDU session modification procedure by the transmission 821a of a PDU session modification request as an NAS message which can include (N1 SM information (PDU session modification request), PDU session ID) message to the AMF 806. Depending on the access type, if the UE was in CM-IDLE mode, this SM-NAS message is preceded by the service request procedure. The N1 message is forwarded by the (R)AN to the 5G core with an indication of user location information. The AMF 806 invokes 821b a Nsmf_PDUSession_UpdateSMContext (PDU session ID) which is transmitted to the SMF 808. The PCF 812 invokes 821c the Npcf_SMPolicyControl_UpdateNotify service operation to notify SMF 808 for initiating the modification of policies procedure upon policy decision or upon AF requests and the modification requires signalling to the UE and/or to the AN. It is noted that for a UE group, the PCF may use shared PDU session ID or UE group ID to modify PCC rules for multiple UEs and/or multiple PDU sessions. The UDM 812 updates 821*d* the subscription data of SMF 808 by Nudm_Subscriber-Data_UpdateNotification (SUPI, Subscription Data). The SMF updates the subscription data and acknowledges the UDM by returning an acknowledgement with output (SUPI). It is noted that for a UE group, the UDM may use UE group ID to update subscription data for multiple UEs. The SMF may use UE group ID when acknowledging the request of UDM. The SMF 808 may decide to modify PDU session. This procedure also may be triggered based on locally configured policy. If the SMF receives a trigger 821*e* in step 821*a* to 821*d*, the SMF starts SMF requested PDU session modification. If notification control is configured for a GBR flow, when the (R)AN decides the QoS targets of the flow cannot be fulfilled. (R)AN 804 sends 821*f* the N2 message (PDU session ID, N2 SM information) to the AMF 806. The N2 SM information includes the QFI, user location information and a notification indicating that the QoS targets cannot be fulfilled. The AMF 806 invokes 821*g* Nsmf_P-DUSession_UpdateSMContext (N2 SM information) which is transmitted to the SMF 808.

According to embodiments, the SMF 808 may need to report some subscribed event to the PCF 814 by invoking 822*a* Nsmf_EventExposure_Notify service operation. The PCF may provide new policy information to the SMF by invoking Npcf_SMPolicyControl_UpdateNotify service operation. This step may be skipped if PDU session modification procedure has been triggered in a previous step. If dynamic PCC is not deployed, the SMF may apply local policy to decide whether to change the QoS profile. For shared PDU session, the SMF use UE group ID and/or shared PDU session ID to report to PCF for subscribed events.

According to embodiments, steps 823 to 827 are not invoked when the PDU session modification requires only action at an UPF, for example gating.

According to embodiments, for UE initiated modification, the SMF 808 responds 823*a* to the AMF 806 through Nsmf_PDUSession_UpdateSMContext (N2 SM information (PDU session ID, QoS profile, session-AMBR), N1 SM information (PDU session modification command (PDU session ID, QoS rule, session-AMBR))). The N2 SM information carries information that the AMF shall provide to the (R)AN. It includes the QoS profiles that were added, removed or modified. The N1 SM Container carries the PDU session modification command that the AMF shall provide to the UE. For network initiated modification, the SMF 808 invokes 823*b* Namf_Communication_N1N2Message-Transfer (N2 SM information (shared PDU session ID, PDU session ID, QoS profile, session-AMBR, shared QoS profile, shared session AMBR), N1 SM container (PDU session modification command (PDU session ID, QoS rule, session-AMBR))) transmission to the AMF 806. If the UE is in CM-IDLE state and an ATC is activated, the AMF updates and stores the UE context based on the Namf_Communication_N1N2MessageTransfer and steps 824, 825, 826 and 827 can be skipped. When the UE is reachable e.g. when the UE enters CM-CONNECTED state, the AMF forwards the N1 message to synchronize the UE context with the UE. For shared PDU Session, the SMF may include shared PDU session ID and shared QoS profile, shared session AMBR. The PDU session ID may be omitted. For some device class, the N1 SM container may be omitted.

According to embodiments, the AMF 806 may send 824 N2 PDU session request (N2 SM information received from SMF, NAS message (PDU session ID, N1 SM information (PDU session modification command))) message to the (R)AN 804. The (R)AN 804 may issue 825 AN specific signalling exchange with the UE 802 that is related with the information received from SMF. For example, in case of a 3GPP RAN, an RRC connection reconfiguration may take place with the UE modifying the necessary RAN resources related to the PDU session. The UE acknowledges the PDU session modification command by sending a NAS message (PDU session ID, N1 SM information (PDU session modification command Ack)) message. For shared PDU session, the (R)AN uses the shared PDU session ID to identify the impacted UEs' PDU sessions and apply the changes to all UEs' PDU sessions.

According to embodiments, the (R)AN 804 may acknowledge N2 PDU session Request by sending 826 a N2 PDU session Ack (QFI(s), RAN tunnel information, NAS message, user location Information) message to the AMF 806. In case of dual connectivity, if one or more QFIs were added to the PDU session, the master RAN node may assign one of these QFIs to a RAN node which was not involved in the PDU session earlier, then the RAN tunnel information includes a new N3 tunnel endpoint for QFIs assigned to the new RAN node. Correspondingly, if one or more QFIs were removed from the PDU session, a RAN node may not be involved in the PDU session anymore, and the corresponding tunnel endpoint is removed from the RAN tunnel information. The AMF 806 forwards 827 the N2 SM information and the N1 SM information (PDU session modification command Ack) received from the AN to the SMF 808 via Nsmf_PDUSession_UpdateSMContext service operation. The SMF 808 may update N4 session of the UPF(s) that are involved by the PDU session modification by sending 828*a* N4 session modification request (N4 Session ID) message to the UPF 810. The UPF 810 can subsequently send 828*b* a N4 session modification response to the SMF 808. For shared PDU sessions, the SMF may use shared PDU session ID to update the shared PDU session context, which shall apply new PCC rules to multiple UEs' PDU sessions. The UPF that are impacted in the PDU session modification procedure depends on the modified QoS parameters and on the deployment. For example, in the case of the session AMBR of a PDU session with an UL CL changes, only the UL CL is involved.

According to embodiments, if the SMF interacted with the PCF in step 821*c* or 822*a*, the SMF 808 notifies 829 the PCF 814 whether the PCC decision could be enforced or not by invoking Nsmf_EventExposure_Notify service operation. The SMF can notify entities that have subscribed to user location information related with PDU session change.

Figure 9:
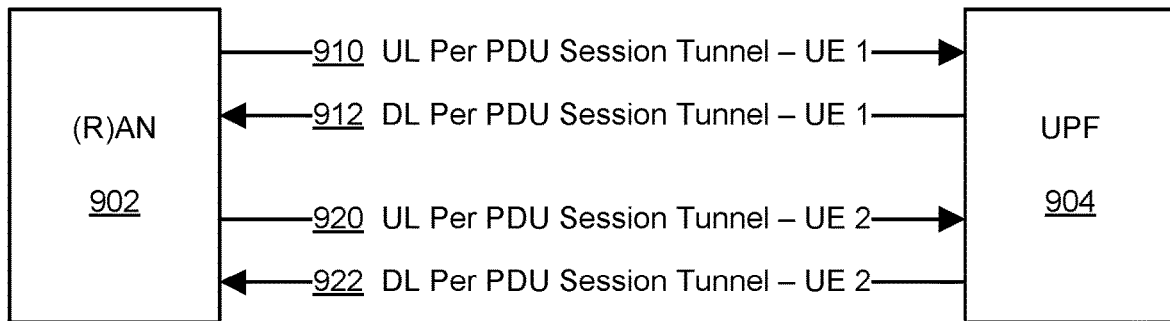
FIG. 9 illustrates a PDU session tunnel model according to the prior art.

FIG. 9 illustrates a PDU session tunnel model according to the prior art. Current 3GPP systems, 3G/4G/5G, employ per PDU Session tunnel between a (R)AN 902 and a UP 904. Each PDU session has two dedicated tunnels in the UL 910, 920 and DL 912, 922. The UL and DL tunnels are reassigned when the UE moves to a new (R)AN node.

Figure 10:
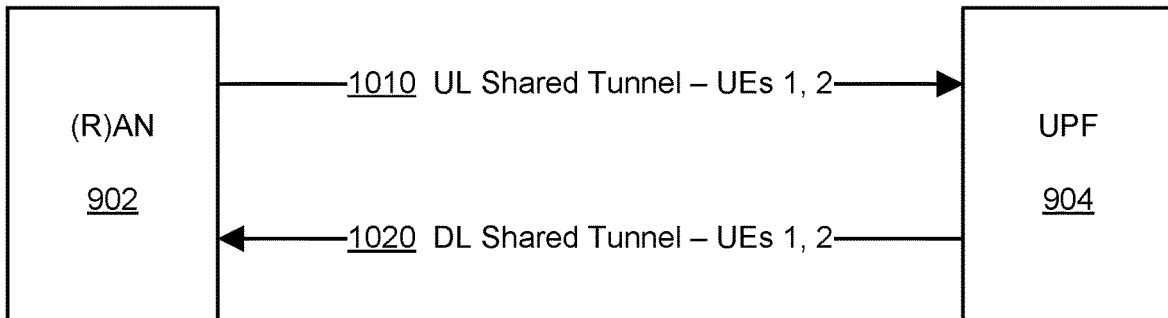
FIG. 10 illustrates a shared tunnel for a hop on concept according to embodiments of the present invention.

FIG. 10 illustrates a shared tunnel for a hop on concept according to embodiments of the present invention. To avoid signaling overhead, the hop-on concept proposes that the UP tunnels can be preconfigured, for example UL shared tunnel 1010 and DL shared tunnel 1020. When the UE is attached to the network, the UE can be associated with the preconfigured tunnels.

However, if the UPF needs the UE ID, represented by TEID for traffic routing and charging. When a shared tunnel is used, the UE ID may be carried in the tunnel header. This may increase the tunnel overhead. In addition, the UPF may need to know the UE location to forward the DL packets. In the hop-on concept, the (R)AN may send a message to the UPF in the UL tunnel to inform the UPF of the new UE location. However, in 5G, the UE location update is performed in the CP. Thus, this may require signaling from the (R)AN to the AMF, then AMF to SMF, then SMF to UPF for UE location update.

Figure 11:
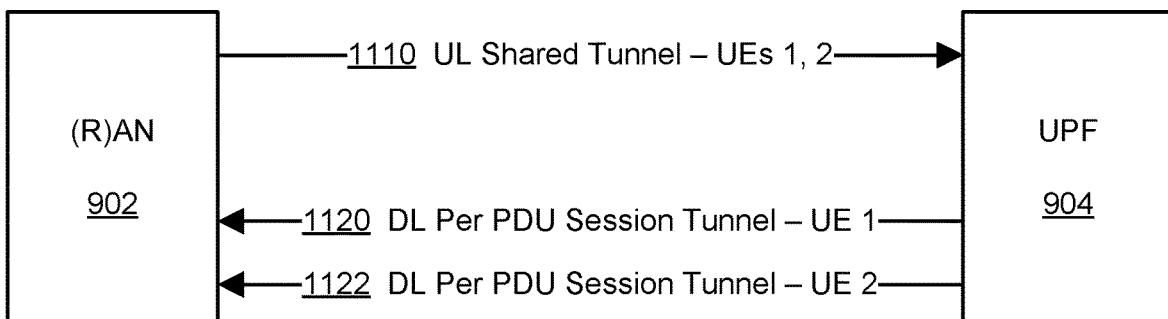
FIG. 11 illustrates a hybrid PDU session tunnel according to embodiments of the present invention.

FIG. 11 illustrates a hybrid PDU session tunnel according to embodiments of the present invention. According to embodiments, the UL and DL tunnel models can be different. For example, the UL tunnel can be shared tunnel 1110, while the DL tunnel is per PDU session tunnel, for example DL PDU session tunnel 1120 and DL PDU session tunnel 1122. This configuration can be suitable for the scenario that all the UPFs do not require UE ID to forward UL packets to the application server. The DL tunnel is not shared so that the UE mobility can be easily handled by the existing solutions already provided for in the 3GPP systems. According to embodiments, it is desired to support mobility UE and the hybrid PDU session tunnel can provide for the UL traffic of many UEs to be sent to the same application server using the pre-configured shared UP connections and the DL UP connection can be dedicated to each UE to support mobility.

According to embodiments, the NEF can be pre-configured by the network management function to serve one or multiple groups of UE, one or multiple network slice instances, one or multiple applications, one or multiple local area data networks (LADN) and one or multiple data networks (DN). The NEF may register itself to the NF repository function (NRF). The NEF can be selected or reselected by CP network functions, such as AMF or SMF or UDM or PCF or the NEF itself. The selection or reselection of the NEF may be determined by the one or more of: DNN, LADN, network slice information (e.g. S-NSSAI), UE ID, UE location, UE group identifiers (e.g. internal group ID, external group ID), UE group subscription information, SMF service area, UPF service area, AS location (e.g. DNAI) and geographical zone identifiers, application ID.

In order to discover which AMF and SMF functions which serve specific UEs, the NEF may need to access the UDM or UDR. According to embodiments, the NEF can send a notification message received from an AF to the serving UDM, PCF, AMF or SMF for the UE group, rather than sending individual messages for each of the UEs. When the UE is registered to the network, the AMF accesses UE subscription information in the UDM and/or UDR and knows about UE Group ID and the pre-configured NEF. If it is the first UE of the UE group, the AMF may subscribe to event notification service of the NEF for specific events such as mobility information of the UE group. The AMF can register to the UDM that this AMF serves the UE group. When the UE requests for PDU session establishment, the AMF selects a SMF to serve the UE and/or the UE group that includes this UE. The SMF accesses the UDM to obtain UE subscription information and also the information about UE group ID and the NEF function that serves the UE or the UE group. The SMF may subscribe to the event notification service of NEF for some events such as AF requests for DNAI reselection. The SMF can register to the UDM that this SMF servers the UE group.

According to embodiments, in some instances due to UE mobility, and/or application server mobility, or denial-of-service (DoS) attack, or load balancing, or NEF maintenance, and other reasons, a particular NEF may not be an optimal NEF for servicing a particular UE or UE group of UEs and as such here can be a need for reselection of the NEF for the UE group. For example, in a vehicle to everything (V2X) situation, the UE or the whole UE group is indicative of the IoT devices associated with a particular vehicle and this vehicle is travelling. In this situation the NEF can be used to send control or data messages from the AF or application server (AS) of V2X application to the specific UEs or all the UEs of UE group of IoT devices. As this vehicle is travelling, the NEF may need to be reselected in order that the NEF is positioned at a more suitable location along the mobility path of the vehicle. In this example, a control plane function, for example the SMF can determine that NEF reselection is required and proceed with the reselection of a more suitable NEF. As another example, a need for reselection of the NEF servicing a UE group can be a result of load balancing. Other instances where NEF reselection may be required would be readily understood by a worker skilled in the art.

Figure 12:
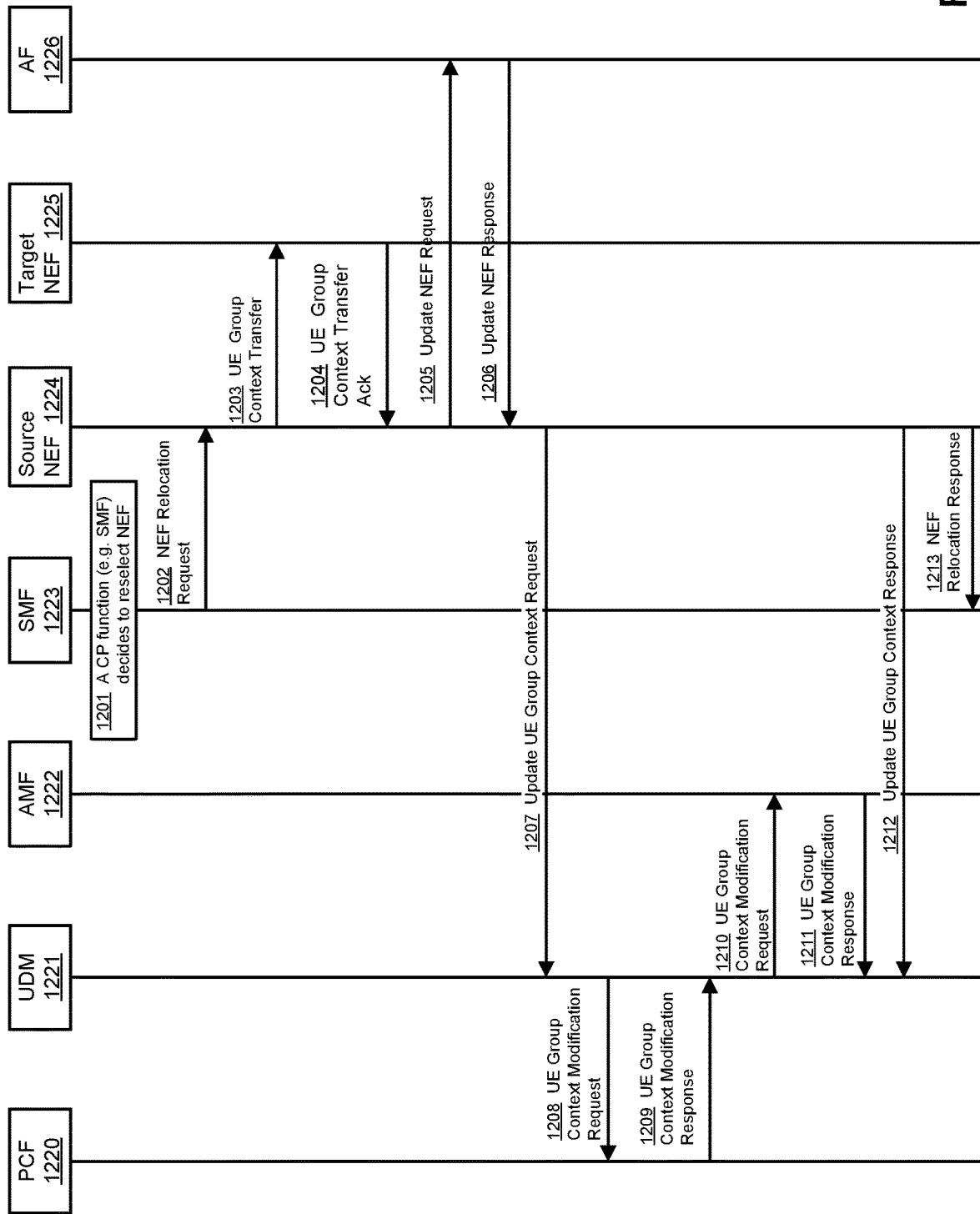
FIG. 12. illustrates a method of NEF reselection in accordance with embodiments of the present invention.

FIG. 12 illustrates an example of a process of selection or reselection of the NEF servicing a group of UEs. In this example, the SMF 1223 determines 1201 that NEF reselection is required and further selects a target NEF 1225, for example, a NEF that is positioned at a more suitable location along a mobility path. The SMF 1223 subsequently transmits 1202 a NEF relocation request to the source NEF 1224. The source NEF 1224 transmits 1203 a UE group context transfer to the target NEF 1225 and the target NEF 1225 transmits 1204 an acknowledgement of same to the source NEF 1224. The source NEF 1224 subsequently transmits 1205 an update NEF request to the AF 1226 and the AF 1226 subsequently transmits 1206 a response to same to the source NEF 1224. The source NEF 1224 transmits 1207 an update UE group context request to the UDM 1221. The UDM 1212 transmits 1208 a UE group context modification request to the PCF 1220 and subsequently receives 1209 a response to same from the PCF 1220. The UDM 1221 transmits 1210 a UE group context modification request to the AMF 1222 and subsequently receives 1211 a response to same from the AMF 1222. In addition, the UDM 1221 transmits 1212 an update UE group context response to the source NEF 1224 and the source NEF 1224 subsequently transmits 1213 a NEF relocation response to the SMF 1223. It is noted that as the source NEF has already sent a UE group context transfer to the target NEF, the AF, SMF, PCF and AMF do not need to correspond with the target NEF as the target NEF has already be advised of this transfer.

Having further regard to FIG. 12, while it is illustrated that the UDM transmits UE group context modification requests to the PCF and the AMF, it will be readily understood that the source NEF can transmit one of or both of these UE group modification requests instead and subsequently receive the corresponding response.

In current V2X platooning solutions, for example when plural UEs are travelling in the same vehicle, the application server selects a particular UE to be a leader for the plurality of UEs in the vehicle. In this configuration, the UE leader receives messages on behalf of the plurality of UEs and the UE leader forwards these messages to the plurality of UEs using device to device (D2D) links, for example PC5 side link in LTE. According to embodiments, when the plurality of UEs have been assigned to a UE group, the application server (AS) is capable of communicating with each of the UEs within the UE group directly. However, for a handover situation, for example is the UE group is defined to include a plurality of UEs travelling in the same vehicle, the handover can be performed by a transfer of the UE group context from a source RAN to a target RAN. In this embodiment, in the RAN or AN, all individual UEs are handed over to the target RAN (T-RAN), wherein the source RAN (S-RAN) transfers the UE group context to the T-RAN and the T-RAN requests a path switch for all UEs by using the UE group context, which may identify shared PDU sessions or non-shared PDU sessions or both. Upon the path switch, the communication for all of the UEs in the UE group will pass through the T-RAN. Since all of the UEs of the UE group may access the same data network (DN), the handover delay associated with the transfer of all of the UEs by transferring the UE group context, when compared to the handover of each of the UEs individually, would be essentially the same or less. However, it will be readily understood that the required signalling overhead that would be required to handover all of the UEs of the group, would be significantly reduced when transferring the UE group context rather than transferring each UE individually.

Figure 13:
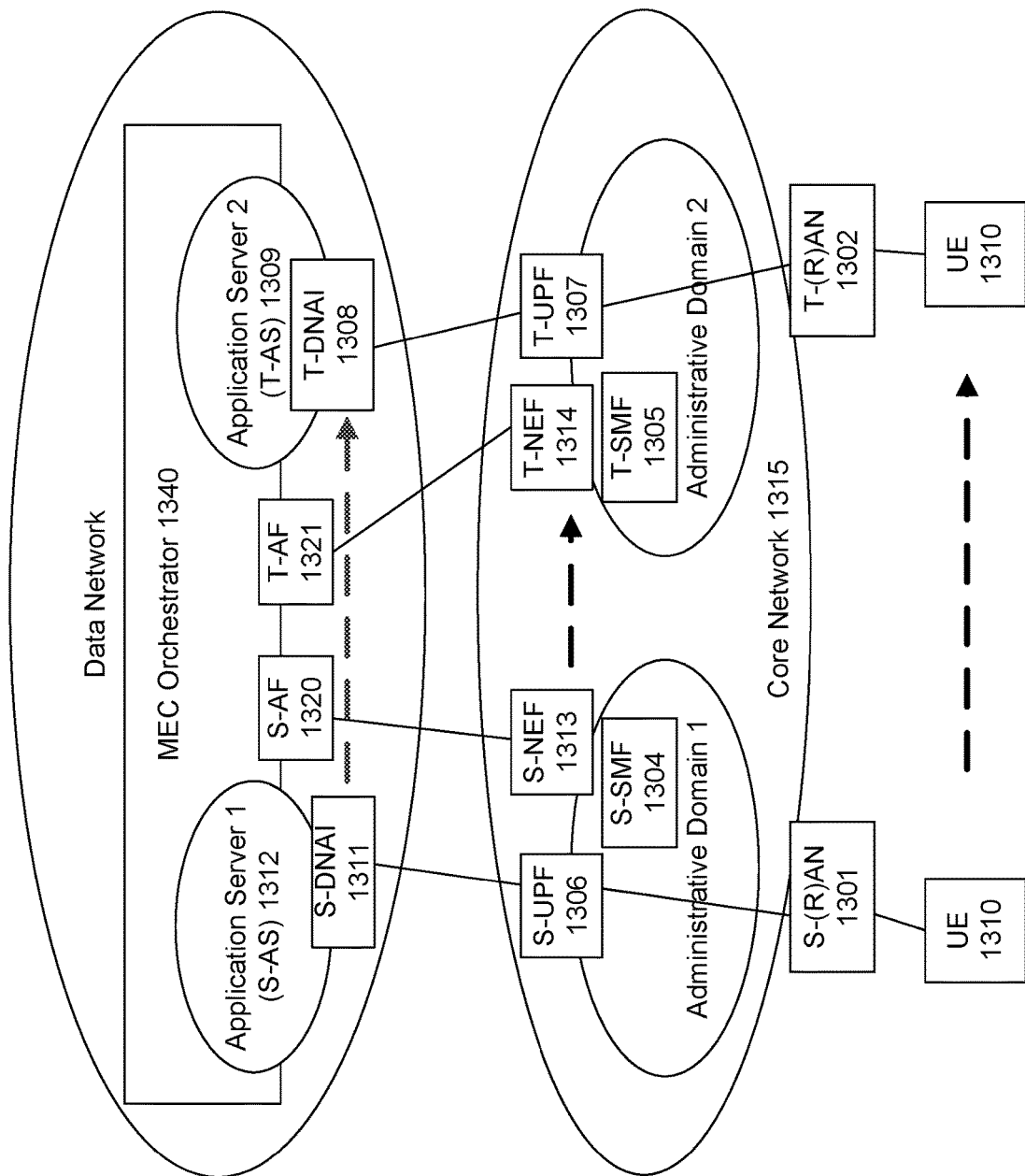
FIG. 13 illustrates a model for selection or reselection of an application function (AF) and NEF, according to embodiments of the present invention.

FIG. 13 illustrates a situation wherein there is a single UE in the UE group, according to embodiments of the present invention. The UE 1310 in the vehicle is moving, from an area served by a S-(R)AN 1301 to another area served by T-(R)AN 1302. During the movement, the UE 1310 may be served by different SMF, Source SMF (S-SMF) 1304 and Target SMF (T-SMF) 1305, and UPF, Source UPF (S-UPF) 1306 to Target UPF (T-UPF) 1307. The T-SMF 1305 may select the T-UPF 1307 to connect the UP path between the T-(R)AN 1302 and the Target DNAI (T-DNAI) 1308. The S-DNAI 1311 provides UP access to the Application Server 1, or Source AS (S-AS) 1312. The T-DNAI 1308 provides UP access to the Application Server 2, or Target AS (T-AS) 1309. The operation of ASs is coordinated by a mobile edge computing (MEC) orchestrator 1340. The MEC Orchestrator 1340 may exchange control messages with the CN 1315 via AFs, such as Source AF (S-AF) 1320 and Target AF (T-AF) 1321. Each AF may be configured by the MEC Orchestrator 1340 to interact with certain NEFs, for example the S-AF 1320 interacts with S-NEF 1313 and T-AF 1321 interacts with T-NEF 1314.

According to embodiments, the application servers and AFs can be part of the mobile edge computing (MEC) platform. The AF is the sound-bound interface, providing control link to the CN of mobile network. The DNAI represents an access point to the user plane of the application in the MEC platform. There can be multiple local ASs that are geographically close to the UE location. The AF may support one or multiple ASs. The NEF may be configured to be associated with one or multiple AFs, and/or associated with one or multiple DNAIs, and/or associated with one or multiple applications, and/or associated with one of multiple DNNs, and/or associated with one or multiple UE groups, and/or associated with one or multiple geographical zone IDs, and/or associated with one or multiple UPFs, and/or associated with one or multiple registration areas, and/or associated with one or multiple LADNs, and/or associated with one or multiple AMFs, and/or associated with one or multiple SMFs, and/or associated with one or multiple PCFs, and/or associated with one or multiple UDSF (unstructured data storage function), and/or associated with one or multiple UDM functions, and/or associated with one or multiple UDR functions.

Figure 14:
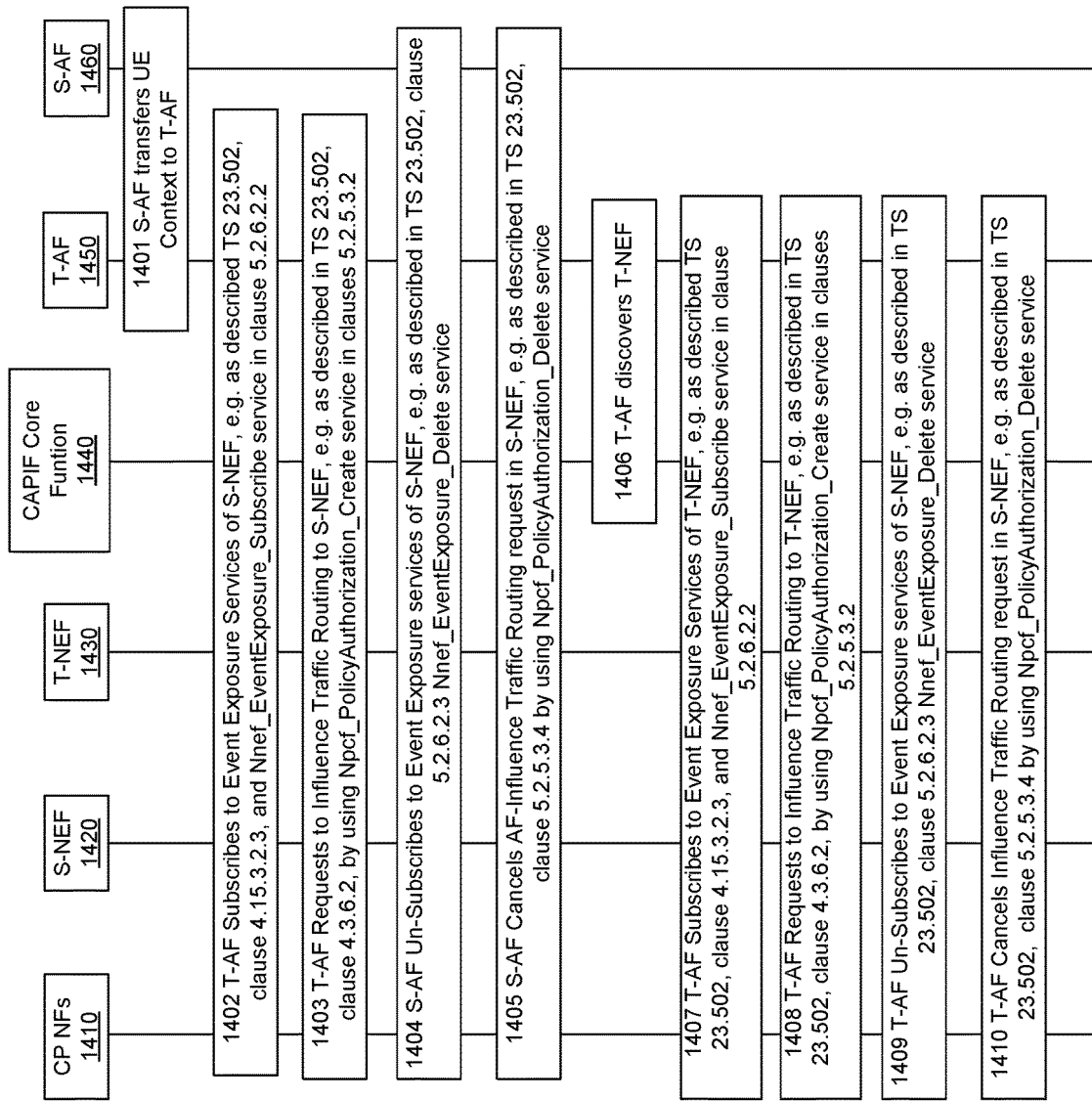
FIG. 14. illustrates a method of NEF selection or reselection by an AF in accordance with embodiments of the present invention.

According to the scenario as shown in FIG. 13, a NEF such as the T-NEF 1314 may be selected by an AF such as the T-AF 1321 based on obtained information. FIG. 14 can be taken as an example. In the method, the T-AF 1450 may obtain the information related to the UE in various ways, e.g., by communicating with one or more function such as the S-AF 1460. Based on the information related to the UE, the T-AF 1450 may replace the S-AF 1460 in the subscription of event exposure services of the S-NEF 1420 and in the transmission of an AF request related to influence on traffic routing, for example through a procedure including steps 1402 to 1405. To perform the selection of the T-NEF 1430 such as step 1406, the T-AF 1450 may obtain the information of the NEF in various way, for example, a CAPIF (common API framework) function 1440, the NRF, or the CP NFs such as AMF and SMF which locally store the NEF information. The selected T-NEF 1430 will replace the S-NEF 1420 to cooperate with the T-AF 1450 further, e.g., in the subscription of event exposure services or in the transmission of an AF request related to influence on traffic routing or both, for example through a procedure including steps 1407 to 1410. FIG. 14 shows a method of selecting or re-selecting an NEF in accordance with embodiments of the present invention. The NEF is used to exchange the CP messages between the CN CP functions and the AF, such as messages relating to requests to influence traffic routing, or messages relating to subscribing to event exposure service. The NEF may be also used to transfer the data packets between the UE and the AF or the AS. The method in FIG. 14 may be applied to individual UEs or UE groups. For example, when applied to individual UEs, the AF can obtain UE contexts and when applied to a UE group, the AF can obtain the UE group context.

In step 1401, the S-AF 1460 transfers the UE context to the T-AF 1450. The UE context stored in the AF contains all the information related to the UE, such as external UE ID, external group ID, GPSI, S-NSSAI, S-NEF ID, UE location information, current subscribed services in the NEFs, such as the S-NEF 1420, transaction ID(s) that represent AF-influence requests sent to the S-NEF 1420. It will be understood, that in some instances, step 1401 includes the transfer of UE group context.

In a case of UE group context, the UE group context may include the UE IDs that are in the UE group, the UE that is the leader (or group master, or group head), the location of all UEs of the UE group. For example, UE group context can include one or more of UE group identifier, one or more protocol data unit (PDU) session contexts, and their PDU session identifiers, one or more shared protocol data unit (PDU) session context and their identifiers and a list of UE IDs which are members of the UE group.

In step 1402, the T-AF 1450 may subscribe to event exposure services of the S-NEF 1420, e.g., as described in 3GPP TS 23.502, 4.15.3.2.3, and by using Nnef_EventExposure_Subscribe service in clause 5.2.6.2.2, for the UE or UEs in the UE group.

In step 1403, the T-AF 1450 may send the influence traffic routing request to the S-NEF 1420, e.g., as described in 3GPP TS 23.502, clause 4.3.6.2, and by using Npcf_PolicyAuthorization_Create service in clauses 5.2.5.3.2, for the UE or UEs in the UE group.

In step 1404, the S-AF 1460 may un-subscribe event exposure services of S-NEF 1420, e.g., as described in 3GPP TS 23.502, clause 5.2.6.2.3 by using Nnef_EventExposure_Delete service, for the UE or UEs in the UE group.

In step 1405, the S-AF 1460 may cancel AF-influence traffic routing request in the S-NEF 1420, e.g., as described in 3GPP TS 23.502, clause 5.2.5.3.4 by using Npcf_PolicyAuthorization_Delete service, for the UE or UEs in the UE group.

In step 1406, the T-AF 1450 may decide to select a new NEF. The information of NEF may be stored in a CAPIF (common API framework) core function 1440. The NEF may provide its configuration information to the CAPIF core function by using a procedure, e.g., as described in clause 8.3 Publish Service API of 3GPP TS 23.222, published in January 2018. The NEF may be configured to serve the whole PLMN network, or some parts of PLMN for example. The NEF may be selected based on the one or more of the following information: PLMN ID, DNN, DNAI(s); applications, represented by application ID(s), AF-Service-Identifier; some network slice instances, represented by S-NSSAI, or NSI-ID (network slice instance ID); UE group ID(s), such as internal group ID, external group ID, IMSI group ID; UE ID(s); AF, such as AF ID, AF IP address, AF FQDN; UPF address (UPF IP address or FQDN); AMF, such as AMF ID, AMF IP address, AMF FQDN; SMF, such as SMF ID, SMF IP address, SMF FQDN. For example, the T-AF 1450 decides to select a new NEF based on the following conditions which can include: PLMN=101, DNN="Internet", AF-Service-Identifier="V2X Application-1", S-NSSAI=100. Assuming that the T-NEF 1430 is configured to serve V2X, where PLMN=101, DNN="Internet", AF-Service-Identifier="V2X Application-1", S-NSSAI=100, the T-NEF 1430 is the new NEF that is selected by the T-AF 1450.

The NEF configuration information can also be stored in the NRF, or locally stored in the CP NFs such as AMF and SMF.

In step 1407, after selecting a T-NEF 1430, the T-AF 1450 may subscribe to event exposure Services of T-NEF 1430, e.g., as described TS 23.502, clause 4.15.3.2.3, and by using Nnef_EventExposure_Subscribe service in clause 5.2.6.2.2.

In step 1408, the T-AF 1450 may send Influence traffic routing requests to the T-NEF 1430, e.g., as described in 3GPP TS 23.502, clause 4.3.6.2, and by using Npcf_PolicyAuthorization_Create service in clauses 5.2.5.3.2.

In step 1409, the T-AF 1450 may un-subscribe to event exposure services of the S-NEF 1420, e.g., as described in 3GPP TS 23.502, clause 5.2.6.2.3 Nnef_EventExposure_Delete service.

In step 1410, the T-AF 1450 may cancel AF-influence traffic routing requests in the S-NEF 1420, e.g., as described in TS 23.502, clause 5.2.5.3.4 by using Npcf_PolicyAuthorization_Delete service.

In steps 1402 to 1405, 1407 to 1410, the S-NEF 1420 and T-NEF 1430 may need to perform subscription or unsubscription for network exposure services of CP functions 1410 such as UDM, AMF, SMF, PCF.

According to embodiments, the above procedure allows a T-AF 1450 to subscribe to the current serving S-NEF 1430.

In some embodiments, the T-AF 1450 may not need to subscribe or send requests to the S-NEF 1420. In this case steps 1402 and 1403 are skipped. The T-AF 1450 subscribes for the event exposure services of the T-NEF 1430 in steps 1404 and 1405. In this case, steps 1409 and 1410 are also skipped.

In some embodiments, the same AF can serve both application servers (S-AS and T-AS). The S-AF 1460 does not need to perform transfer the UE context information to the T-AF 1450. Steps 1401 to 1405 are skipped. Steps 1406 to 1410 are performed with the T-AF is replaced by S-AF since there the S-AF and T-AF are the same.

Figure 15:
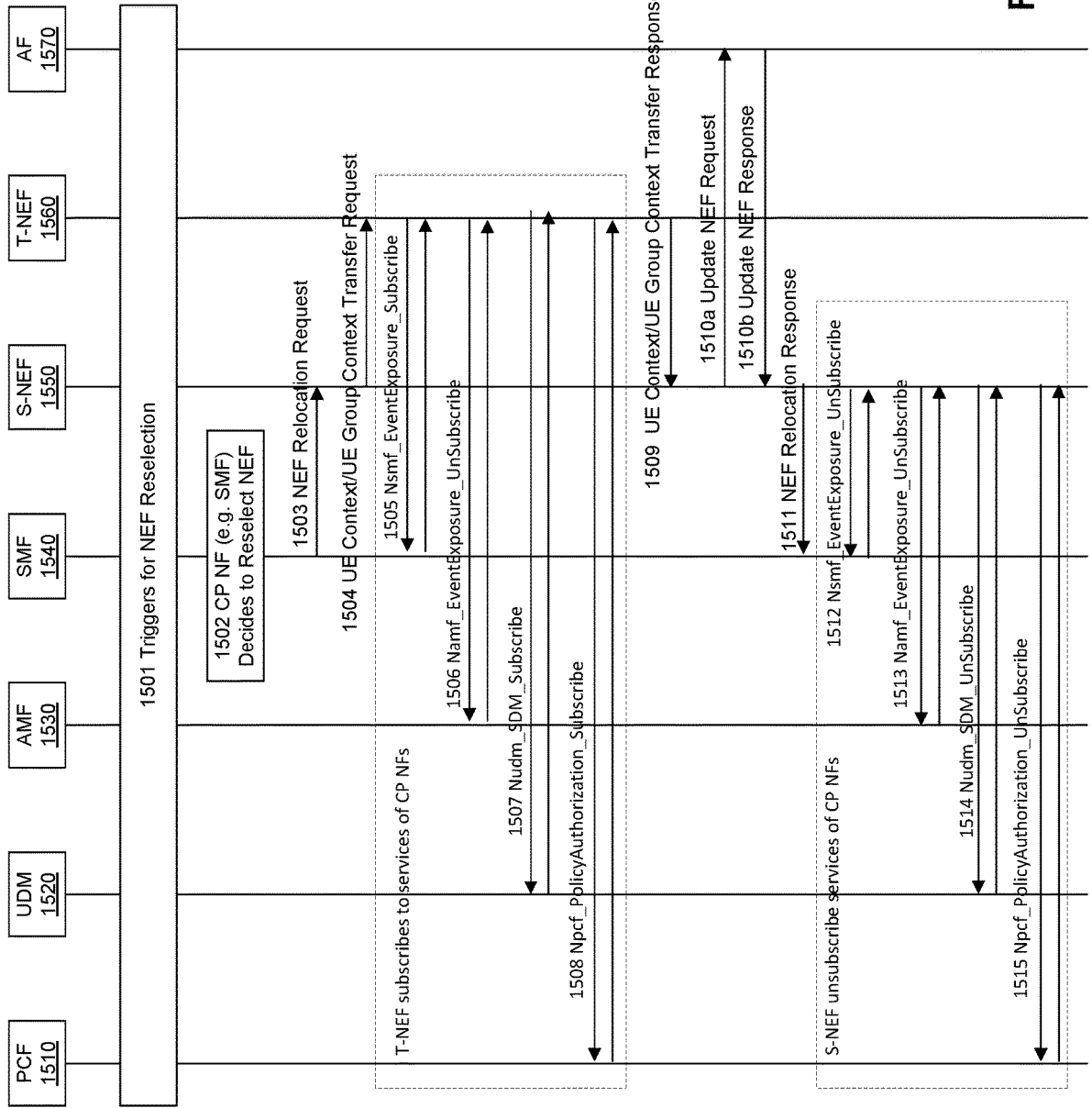
FIG. 15. illustrates a method of NEF selection or reselection by a CP in accordance with embodiments of the present invention.

FIG. 15 illustrate another NEF re-selection embodiment, where a control plane network function, such as SMF, may trigger the re-selection of NEF. The procedure may include the following steps.

In step 1501, a number of triggers could require a re-selection of NEF. For example a trigger can be a result of one or more of: UE mobility event, when UE moves to new location that is served by a new (R)AN node, during the handover procedure, the SMF 1540 is notified by the AMF 1530 about new UE location; application mobility event, where the application server (AS) may be relocated to a new data centres or to another computing machine in the same data centre, the AF may send AF-influence traffic routing to the SMF 1540 via the PCF 1510; and load balancing among NEF, maintenance, relocation of S-NEF in data centres, denial of service (DoS) attack, a network management function, such as Operation, Administration, and Management (OAM) function may inform the SMF 1540. For example, if the current NEF is highly loaded, the NEF may inform a CP NF, such as SMF, to request NEF re-selection.

In step 1502, a CP NF, such as SMF 1540 decides to select another NEF to serve the UE or the PDU Session of the UE based on triggers from step 1501. The SMF may interact with the NRF or a CAPIF Core function to identify a suitable NEF. The CP, such as SMF, may provide one or more of the following information to the NRF or CAPIF Core function: mobile network information, such as PLMN ID, DNN; network slice information, represented by e.g. S-NSSAI, or NSI-ID; application information, such as AF-service-identifier, application ID, external application ID, internal application ID, DNAI information (e.g. DNAI ID); UE information, such as internal group ID, IMSI group ID, external group ID, UE ID (e.g. SUPI, GPSI); UE location information, such as serving (R)AN node ID, (R)AN IP address or FQDN; CP network function information of serving AMF, SMF, PCF, UDM information (e.g. network function ID, or, IP Address, or FQDN); and UPF information, for example the UPF ID, or its IP address or FQDN.

In some embodiments, the S-NEF 1550 may initiate the NEF reselection itself. In this method, in step 1502, the S-NEF 1550 may directly interact with the NRF or CAPIF Core function to identify a T-NEF. An NEF may have locally stored information to select another NEF.

In some embodiments, the NRF or CAPIF Core function may provide the list of possible NEFs that could serve the UE or the PDU session, together with attributes of the NEFs to the requested CP NF. The attributes of the NEF could include one or more of the following information: mobile network information, such as PLMN ID, DNN; network slice information, represented by e.g. S-NSSAI, or NSI-ID; application information, such as AF-service-identifier, application ID, external application ID, internal application ID, DNAI information (e.g. DNAI ID); UE information, such as internal group ID, IMSI group ID, external group ID, UE ID (e.g. SUPI, GPSI); UE location information, such as serving (R)AN node ID, (R)AN IP address or FQDN; CP network function information of serving AMF, SMF, PCF, UDM information (e.g. network function ID, or, IP address, or FQDN); and UPF information: the UPF ID, or its IP address or FQDN. The NRF or CAPIF Core function may return the list of NEFs that match the information provided by the SMF 1540, and optionally, the load information of the NEFs. The load information could be the percentage of resources of NEF are being used.

In step 1503, if a CP NF, such as SMF 1540, sends to the S-NEF a request for a NEF relocation, e.g., a NEF relocation request. The request may include one or more of the following: CP NF ID (such as SMF ID, SMF IP address or FQDN); the information of the T-NEF 1560 (such as T-NEF ID, or IP address, or FQDN); the time to start NEF relocation (immediate or scheduled time and date); the information to identify the UE: SUPI, GPSI, and/or internal group ID, or an internal transaction ID associated with a previous request from the AF 1570; the information to identify PDU session of the UE, such as packet flow description (PFD); location information: e.g. geographical zone IDs; and the information to identify application: e.g. application ID, AF-service-identifier, DNAI.

In some embodiments, all the operation of the S-NEF 1550 may be transferred to the T-NEF 1560. In step 1503, the CP function, such as SMF 1540, may provide CP NF ID (such as SMF ID, SMF IP address or FQDN); the information of the T-NEF 1560 (such as T-NEF ID, or IP address, or FQDN); the time to start NEF relocation (immediate or scheduled time and date) to the S-NEF 1550.

According to some embodiments, the CP NF, such as SMF 1540, may use a service of NEF, namely Nnef_UEContext_Relocation service described in the present application, to send the NEF Relocation Request.

In step 1504, the S-NEF 1550 sends to the T-NEF 1560 a request for transferring UE context, e.g. UE context (or UE group context) transfer request. The request may include the one or more of the following information: the S-NEF ID; time to start NEF re-selection: immediate or at a scheduled time; the UE context information, which can include UE related information, AF related information, information on subscribed services of CP NFs and information on user plane. According to embodiments, UE related information can include one or more of UE ID (SUPI, GPSI, IP address/prefix); parameter mapping of SUPI to GPSI; external group ID; mapping of external Group ID and IMSI-Group ID. According to embodiments, AF related information can include one or more of AF-Service-Identifier (for example edge computing applications); whether the AF is authorized or not; parameter mapping of AF-service-identifier and 5GC information (DNN, S-NSSAI) (for example edge computing applications); parameter mapping of AF-service-identifier and a list of DNAI(s) and routing profile ID(s) (edge computing); parameter mapping of external application identifier to the corresponding application identifier known at the PFDF (PFD management); AF request: mapping of AF transaction internal ID and AF transaction ID in the AF request (edge computing); AF subscription for event monitoring (for example event exposure services of CN): "NEF records the association of the event trigger and the requester identity."; and Quota or Rate of Trigger Submission (for example SMS over NAS applications). According to embodiments, information on subscribed services of CP NFs can include one or more of CP NF IDs that the S-NEF subscribed their services: SMF ID, PCF ID, UDM ID, AMF ID, and others; the NEF stores AF notification reporting information received from the AF and maps it to NEF notification reporting information intended for PCF(s) (for example edge computing applications); PCF subscription for NEF notification about AF request (for example in edge computing applications); event subscription of NEF for monitoring event exposure; event filters (for example bulk subscription services); AMF events, including bulk subscription for many UEs (for example event exposure service); and UDM events (for example event exposure services). According to embodiments, information on the user plane can include one or more of the UPF that provides UP connection for IoT messages transfer between the AF/AS to the UE and PDU session context of the UE that use the S-NEF for communication with the AF or AS.

According to some embodiments the S-NEF 1550 may use the Nnef_UEContext_Create described in the present document to send the UE information from the S-NEF 1550 to the T-NEF 1560.

According to some embodiments, the NEF may store the UE context in a local storage media. Alternatively, the NEF may store the UE context in an external storage function such as UDSF (unstructured data storage function), UDR. If the UE context is stored in an external storage function, the S-NEF 1550 retrieves the UE context from the storage function and sends to the T-NEF 1560. Alternatively, the S-NEF 1550 may inform the T-NEF 1560 the location of the UE context, which may include the network storage function address or ID (e.g. UDSF IP address, UDSF ID, UDR ID, UDR IP address), the UE information (UE ID (GPSI, SUPI, external UE identifier)). In case of UE group, the S-NEF 1550 may include the internal group ID, or external group ID.

According to some embodiments the S-NEF 1550 may also notify the CP function, such as UDM, SMF, AMF, and PCF the location of UE context of NEF. This step is not shown in FIG. 15. In case a DoS attack happens to the S-NEF 1550, the SMF 1540 may directly send a NEF relocation request to the T-NEF 1560. This request may include the storage location of NEF UE context for the T-NEF 1560 to retrieve. In some scenarios, e.g. a DoS attack scenario, NEF failure, and some other scenarios, steps 1504, 1512, 1513, 1514, 1515 may be skipped.

According to embodiments, subsequently, the T-NEF 1560 may subscribe to the services of CP NFs.

In step 1505, the T-NEF 1560 may subscribe to the event exposure service of the SMF 1540, e.g., by using "Nsmf_EventExposure_Subscribe" service, as described in 3GPP TS 23.502, clause 5.2.8.3.

In step 1506, the T-NEF 1560 may subscribe to the event exposure service of the AMF 1530, e.g., by using "Namf_EventExposure_Subscribe" service, as described in 3GPP TS 23.502, clause 5.2.2.3.

In step 1507, the T-NEF 1560 may subscribe to the event exposure service of the UDM 1520, e.g., by using "Nudm_EventExposure_Subscribe" service, as described in 3GPP TS 23.502, clause 5.2.3.5.

In step 1508, the T-NEF 1560 may subscribe to the event exposure service of the PCF 1510, e.g., by using "Npcf_Policy Authorization_Subscribe" service, as described in 3GPP TS 23.502, clause 5.2.5.3.

In step 1509, after completing all subscription services, the T-NEF 1560 sends to the S-NEF 1550, e.g. the UE context (or UE group context) transfer response, to confirm that the T-NEF is ready to serve the AF 1570. The T-NEF 1550 may use the Nnef_UEContext_Create described in the present document to send the UE Context Transfer Response from the T-NEF 1560 to the T-NEF 1550.

In step 1510*a*, the S-NEF 1550 may send a message to request the AF updating the NEF information, e.g. update NEF request, to the AF 1570 so that the AF 1570 will communicate with the new T-NEF 1560. The message may include an identifier of T-NEF 1560, such as IP address, or NEF ID and a cause code indicating the reason to change the NEF.

In step 1510*b*, the AF 1570 may send an acknowledgment, e.g. update NEF response, to the S-NEF 1550 to confirm the reception of the new NEF information. The AF 1570 use the T-NEF 1560 for communication with the CN NFs. If the S-NEF 1550 receives any notification messages from other CP functions related to the UE or PDU session that has been transferred to the T-NEF 1560, the S-NEF 1550 will not forward these messages to the AF 1570. This is to avoid forwarding the same notification messages from the S-NEF 1550 and the T-NEF 1560 to the AF 1570.

In some embodiments, steps 1510*a* and 1510*b* can be implemented by using a service of AF, namely Naf_UEContext_Update, described in the present document.

In case of a DoS attach, NEF failure or maintenance, or some other scenarios, the T-NEF 1560, instead of S-NEF 1550, sends message in step 1510a to the AF. The message may include identifiers of S-NEF and T-NEF 1560, such as IP addresses, or NEF IDs, a cause code indicating the reason to change the NEF (e.g. DoS attack, NEF failure, NEF maintenance, load balancing, better packet delay), and transaction ID(s) that the AF 1570 has used to send AF-influence traffic routing requests to the CN previously. In this case, the AF 1570 sends an update NEF response to the T-NEF 1560, instead to the S-NEF 1550.

In step 1511, the S-NEF 1550 may send a message to, e.g. NEF Relocation Response to the CP, such as SMF. This is to confirm that the newly selected T-NEF 1560 is ready for exchanging CP messages or UP data packets with the AF 1570 or the application server.

According to some embodiments, the S-NEF 1550 may use a service of NEF, namely Nnef_UEContext_Relocation service described in the present application, to send the NEF relocation response to the SMF 1540.

Subsequently, the S-NEF 1550 may unsubscribe the services of CP NFs.

In step 1512, the T-NEF 1560 may unsubscribe to the event exposure service of the SMF 1540, by using "Nsm-f_EventExposure_UnSubscribe" service, e.g. as described in 3GPP TS 23.502, clause 5.2.8.3.

In step 1513, the S-NEF 1560 may unsubscribe to the event exposure service of the AMF 1530, by using "Nam-f_EventExposure_UnSubscribe" service, e.g. as described in 3GPP TS 23.502, clause 5.2.2.3.

In step 1514, the T-NEF 1560 may unsubscribe to the event exposure service of the UDM 1520, by using "Nud-m_EventExposure_UnSubscribe" service, e.g. as described in 3GPP TS 23.502, clause 5.2.3.5.

In step 1515, the T-NEF 1560 may unsubscribe to the event exposure service of the PCF 1510, "Npcf_Policy Authorization_UnSubscribe" service, e.g. as described in 3GPP TS 23.502, clause 5.2.5.3.

In FIG. 14 and FIG. 15, the UE context may be transfer or updated in the AF. By using a service-based interface, the AF can provide the following services to support UE context transfer and update between two AF functions. Services of the AF related to UE context (e.g. could be named as Naf_UEContext) may include UE context creation (e.g. could be named Naf_UEContext_Create), UE context update (e,g, which could be named Naf_UEContext_Update), UE context release in AF (e.g. which could be named Naf_UEContext_Release) and get UE context from an AF (e.g. which could be named Naf_UEContext_Get).

According to embodiments, UE context creation enables the creation of a new UE context in the AF. The required input can include UE ID (e.g. GPSI, IMSI). Optional input can include one or more of UE location information, subscription get notified of PDU session status change, PEI, GPSI, AN type, NEF ID, UE related information (UE ID (SUPI, GPSI, IP address(es)/prefix(es))), whether the AF is authorized or not, transaction IDs (each corresponds to one AF request), AF Subscription for Event Monitoring (event exposure), information on subscribed services of CP NFs; CP NF IDs that the S-NEF subscribed their services: SMF ID, PCF ID, UDM ID, AMF ID, and others and event filters (for bulk subscription). The required output from UE context creation function is a result indication, for example success or not success, and in some embodiments an optional output can be a cause.

According to embodiments, the UE context update function can enable the updating of an existing UE context in the AF. The input can include UE ID (e.g. GPSI, IMSI). The input can optionally include one or more of UE location information, subscription get notified of PDU session status change, PEI, GPSI, AN type, NEF ID, UE related information (UE ID (SUPI, GPSI, IP address(es)/prefix(es))), whether the AF is authorized or not, transaction IDs (each corresponds to one AF request), AF subscription for event monitoring (event exposure), information on subscribed services of CP NFs; CP NF IDs that the S-NEF subscribed their services: SMF ID, PCF ID, UDM ID, AMF ID, and others; and event filters (bulk subscription). The required output from UE context update function is a result indication, for example success or not success, and in some embodiments an optional output can be a cause or external UE ID or both.

According to embodiments, the UE context release in AF function can release an existing UE context in the AF. The required input can include UE ID (e.g. GPSI, IMSI, external UE ID). The required output from UE context release function is a result indication, for example success or not success, and in some embodiments an optional output can be a cause or external UE ID or both.

According to embodiments, the get UE context from AF function can enable a consumer function to get the UE context in an AF. The required input can include UE ID (e.g. GPSI, IMSI). The required output from the get UE context from AF function is a result indication, for example success or not success, and UE context stored in AF. In some embodiments an optional output can be a cause (e.g. UE context does not exist, UE context is not allowed to be transferred out of AF, UE ID (e.g. external UE ID, GPSI).

According to embodiment, services of the NEF related to UE context (e.g., the name of the service could be Nnef_U-EContext) include UE context creation in NEF (e.g. which could be named Nnef_UEContext_Create), UE context update in NEF (e.g. which could be named Nnef_UEContext_Update), UE context release in NEF (e.g. which could be named Nnef_UEContext_Release), UE context relocation (e.g. which could be named Nnef_UEContext_Relocation) and get UE context from an NEF (e.g. which could be named Nnef_UEContext_Get).

According to embodiments the UE context creation in NEF function can create a new UE context in the NEF. The required input can include UE ID (e.g. SUPI, GPSI, IMSI, 5G-GUTI). Optional input can include one or more of: UE related information: IP address/prefix, UE location (e.g. RAN address) parameter mapping of SUPI to GPSI, internal-group ID, external group ID, mapping of external group ID and IMSI-group ID, mapping of external group ID and internal-group ID, packet flow description (PFD); AF related information: AF-service-identifier, whether the AF is authorized or not, parameter mapping of AF-service-identifier and 5GC information (DNN, S-NSSAI), parameter mapping of AF-service-identifier and a list of DNAI(s) and routing profile ID(s), parameter mapping of external application identifier to the corresponding application identifier known at the PFDF (PFD management); AF request: mapping of AF transaction internal ID and AF transaction ID in the AF request (edge computing); AF subscription for event monitoring (event exposure): "NEF records the association of the event trigger and the requester identity."; quota or rate of trigger submission (SMS over NAS); information on subscribed services of CP NFs; information on user plane and PDU session context of the UE that use the S-NEF for communication with the AF or AS. According to embodiments, information on subscribed services of CP NFs can include one or more of CP NF IDs that the S-NEF subscribed their services: SMF ID, PCF ID, UDM ID, AMF ID, and others; the NEF stores AF notification reporting information received from the AF and maps it to NEF notification reporting information intended for PCF(s) (edge computing); PCF subscription for NEF notification about AF request (edge computing); event subscription of NEF for monitoring event exposure; event filters (bulk subscription); AMF events, including bulk subscription for many UEs (event exposure); and UDM events (event exposure). According to embodiments, information on the user plane can include the UPF that provides UP connection for IoT messages transfer between the AF/AS to the UE. The required output from the UE context creation in NEF function is a result indication, for example success or not success, and in some embodiments an optional output can be a cause.

According to embodiment, the UE context update in NEF function can update an existing UE context in the NEF. The required input can include UE ID (e.g. GPSI, IMSI). Optional input can include one or more of UE related information: IP address/prefix, UE location (e.g. RAN address), parameter mapping of SUPI to GPSI, external group ID, mapping of external group ID and IMSI-group ID, packet flow description (PFD); AF related information: AF-service-identifier, whether the AF is authorized or not, parameter mapping of AF-service-identifier and 5GC information (DNN, S-NSSAI), parameter mapping of AF-service-identifier and a list of DNAI(s) and routing profile ID(s), parameter mapping of external application identifier to the corresponding application identifier known at the PFDF (PFD management); AF request: mapping of AF transaction internal ID and AF transaction ID in the AF request (edge computing); AF subscription for event monitoring (event exposure): "NEF records the association of the event trigger and the requester identity."; quota or rate of trigger submission (SMS over NAS); information on subscribed services of CP NFs; information on user plane and PDU session context of the UE that use the S-NEF for communication with the AF or AS. According to embodiments, information on subscribed services of CP NFs can include one or more of CP NF IDs that the S-NEF subscribed their services: SMF ID, PCF ID, UDM ID, AMF ID, and others; The NEF stores AF notification reporting information received from the AF and maps it to NEF notification reporting information intended for PCF(s) (edge computing); PCF subscription for NEF notification about AF request (edge computing); event subscription of NEF for monitoring event exposure; event filters (bulk subscription); AMF events, including bulk subscription for many UEs (Event Exposure); and UDM events (Event Exposure). According to embodiments, information on the user plane can include the UPF that provides UP connection for IoT messages transfer between the AF/AS to the UE. The required output from the UE context creation in NEF function is a result indication, for example success or not success, and in some embodiments an optional output can be a cause.

According to embodiments, the UE context release in NEF function can release an exiting UE context in the NEF. The required input may include one or more of the following information: UE ID (e.g. SUPI, GPSI, IMSI), internal group ID, external group ID, AF-service-identifier, network slice information (e.g. S-NSSAI, or NSI ID), location information (e.g. geographical zone IDs), CP function information (e.g. PCF ID, SMF ID). The required output from UE context release in NEF function is a result indication, for example success or not success, and in some embodiments an optional output can be a cause or external UE ID or both.

According to embodiments, the UE context relocation function can enable a consumer function to request relocation of an existing UE context in the NEF to another NEF. The required input may include one or more of following information:information to identify CP NF requesting UE context relocation (such as SMF ID, SMF IP address or FQDN); the information of the T-NEF 1560 (such as T-NEF ID, or IP address, or FQDN); the time to start NEF relocation (immediate or scheduled time and date); information to identify network slice, e.g. S-NSSAI, NSI-ID; the information to identify the UE, e.g. one or more of SUPI, GPSI, internal group ID, and external group ID, IMSI group ID; information to identify AF request, e.g. an internal transaction ID associated with a previous request from the AF 1570; the information to identify PDU session of the UE, such as packet flow description (PFD); location information (e.g. geographical zone IDs, UPF serving area, registration area, LADN service area, SMF service area, AMF service area); and the information to identify application (e.g. DNN, application ID, AF-service-identifier, DNAI). The input may optionally include a cause (e.g. maintenance, DoS attack, load balancing). The required output from UE context relocation function is a result indication, for example success or not success, and in some embodiments an optional output can include a cause (e.g. UE context does not exist, UE context is not allowed to be relocated). For example, if one UE context is to be relocated, the consumer function may provide the UE ID. If UE contexts of all UEs of one UE group is to be transferred, the consumer function may provide the internal group ID. If the UE context of all UEs using an application, the consumer function may provide the AF-service-identifier, or application ID.

According to embodiments, the get UE context from an NEF function can enable a consumer function to get UE context in an NEF. The required input can include one or more of the following information: information to identify CP NF requesting UE context relocation (such as SMF ID, SMF IP address or FQDN); information to identify network slice, e.g. S-NSSAI, NSI-ID; the information to identify the UE, e.g. one or more of SUPI, GPSI, internal group ID, external group ID and IMSI group ID; information to identify AF request, e.g. an internal transaction ID associated with a previous request from the AF 1570; information to identify PDU session of the UE, such as packet flow description (PFD); location information (e.g. geographical zone IDs, UPF serving area, registration area, LADN service area, SMF service area, AMF service area); and information to identify application (e.g. DNN, application ID, AF-service-identifier, DNAI). The optional input can include a cause. The required output from get UE context from an NEF function is a result indication, for example success or not success and the UE context stored in the NEF. In some embodiments an optional output can be a cause (e.g. UE context does not exist, UE context is not allowed to be transferred out of NEF), UE ID (e.g. SUPI, GPSI).

The NEF may provide a relocation service to other functions. This service may be named Nnef_Relocation. A consumer function may request to replace a source NEF by another target NEF. The target NEF get all the UE context data from the source NEF or a separate storage function, e.g. the UDR or UDSF. The consumer function may send to the target NEF one or more of the following information: the source NEF ID (or IP address, FQDN); UE information e.g. UE ID (e.g. SUPI, GPSI, internal Group ID, external group ID); storage function information (e.g. source NEF ID, source NEF IP address, UDR ID, or UDR IP address, UDSF IP, UDSF IP address); cause (e.g. maintenance, DoS attack, load balancing). The target may send to the consumer function the result, which may include one or more of the following information: result indication (success, not success); cause (e.g. UDR data query error). To fulfil the NEF relocation request, the target NEF may access all the UE context data from the provided source that keeps the UE context data, such as source NEF or a storage function. More details in this regard are explained in FIG. 16 as an example.

The CAPIF core function can provide notifications for CAPIF events. The CAPIF events may be an NEF instance is out of service (e.g. due to network maintenance, hardware error, software error, DoS attack), an NEF instance is added, an NEF is replaced by another NEF.

The AF can subscribe for CAPIF event notifications. When subscribing for CAPIF event, the AF may provide its AF ID an event filter, which may include the PLMN ID, DNN, LADN, network slice information (such as S-NSSAI, NSI-ID), UE group (such as external group ID), application information (such as AF-service-ID, application ID), location information (such as geographical zone ID), UE information (such as GPSI, external UE ID, IMSI), NEF information (such as NEF ID, or API ID). The CAPIF shall send CAPIF notifications to the subscribed AF when the conditions of CAPIF events are matched with the event filter.

The NEF UE context of certain services, such as URLLC, may be stored in a separate storage function such as UDSF. The NEF, which is in charge of support UE connection may inform the CAPIF core function the location of the NEF UE Context, such as the ID, IP address, or FQDN of the UDSF. If one NEF instance is out of service for some reason, the CAPIF, or AF may select another the UE. The CAPIF can provide newly selected NEF instance with the location of the UE context so that the newly selected NEF is ready to fulfill the AF requests without any interruption.

Figure 16:
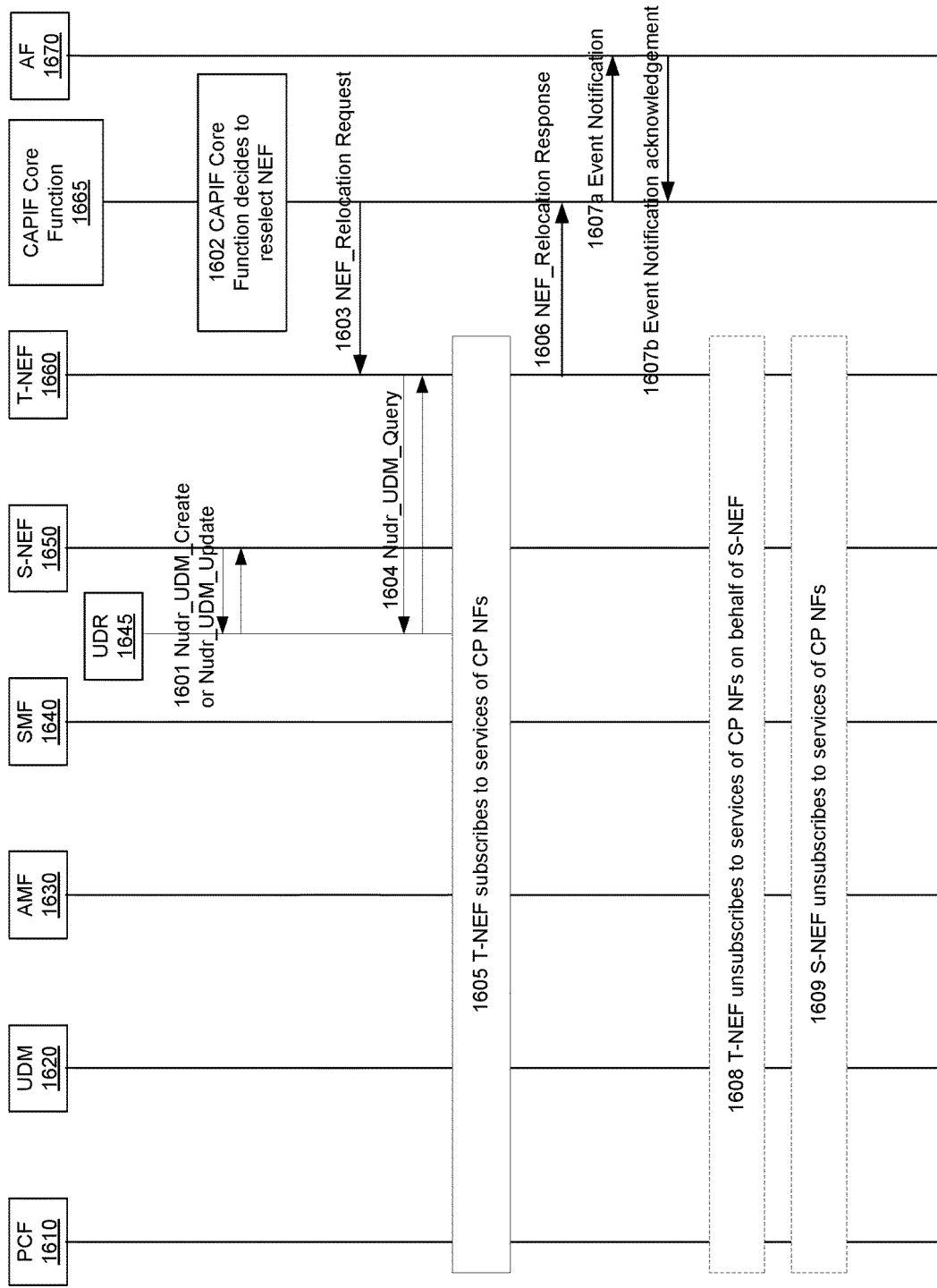
FIG. 16. illustrates a method of NEF relocation in accordance with embodiments of the present invention.

FIG. 16 illustrates a method to relocate an NEF in accordance with embodiments of the present invention.

In step 1601, the S-NEF 1650 stores the UE context, PDU session context or both in the UDR 1645, e.g., by using services of UDR 1645. In the UE context, PDU session context or both, is created for the first time, a service which may be called Nudr_UDM_Create, is used. If the UE context, PDU session context, or both is already created, the S-NEF 1650 may use a service which may be called Nudr_UDM_Update to update the UE context, PDU session context or both.

In step 1602, the CAPIF Core function 1665 decides to reselect another T-NEF 1660 to replace the S-NEF 1650. The S-NEF 1650 may need to be reselected in certain scenarios, for example DoS attack, NEF failure, NEF maintenance. In these scenarios, the network management function, such as Operation Administration Management (OAM) function, may inform the CAPIF Core function 1665 about the unavailability of the S-NEF 1650. Alternatively, the S-NEF 1650 may notify the CAPIF Core function about its status (e.g. DoS attack, NEF failure, NEF maintenance). This step is not shown in FIG. 16.

The S-NEF 1650 may also notify the CAPIF Core Function 1665 about its unavailability by sending a request which may be called "Service API Unpublish" request e.g. as described in clause 8.4 of 3GPP TS 23.222, published in January 2018. This step is not shown in FIG. 16.

In step 1603, the CAPIF Core function 1665 may use NEF_Relocation service to send relocation request to the T-NEF 1660.

In step 1604, the T-NEF 1660 may get the UE contexts if they are stored in a storage function, e.g., by using a service which may be called Nudr_UDM_Query service of the UDR 1645 to get the UE context, PDU session context, or both previously stored by the S-NEF 1650.

In step 1605, the T-NEF 1650 may subscribe to the exposure event notification services of CP functions, such as PCF 1610, UDM 1620, AMF 1630, or SMF 1640 for example as previously described with reference in FIG. 15.

In step 1606, the T-NEF 1650 may send a response, e.g. by using NEF_Relocation Response to the CAPIF Core function 1665 for step 1603.

In step 1607*a*, the CAPIF Core function 1665 may send a message, e.g. event notification, to the subscribed AF 1670 to inform the unavailability of the S-NEF 1650 and the information of replacement T-NEF 1660, such as the ID or IP address of the T-NEF 1660.

In step 1607*b*, the AF 1670 may send a message, e.g. event notification acknowledgement, to the CAPIF Core function 1665 to response the message in step 1607*a*.

In step 1608, the T-NEF 1660 may unsubscribe on behalf of the S-NEF 1650 the exposure event notification services that the S-NEF 1650 subscribed to the CP functions, such as PCF 1610, UDM 1620, AMF 1630, or SMF 1640, previously.

In step 1609, alternatively, the S-NEF 1650 may unsubscribe the exposure event notification services that the S-NEF 1650 subscribed to the CP functions, such as PCF 1610, UDM 1620, AMF 1630, or SMF 1640, previously.

The method as illustrated in FIG. 16 can have several advantages. First the AF 1670 does not need to resend all the AF-influence traffic routing and subscription requests for network exposure event notification services in case the S-NEF 1650 is out of service. This would help to reduce the service interruption time that the CN CP functions and the AF cannot exchange control messages.

Figure 17:
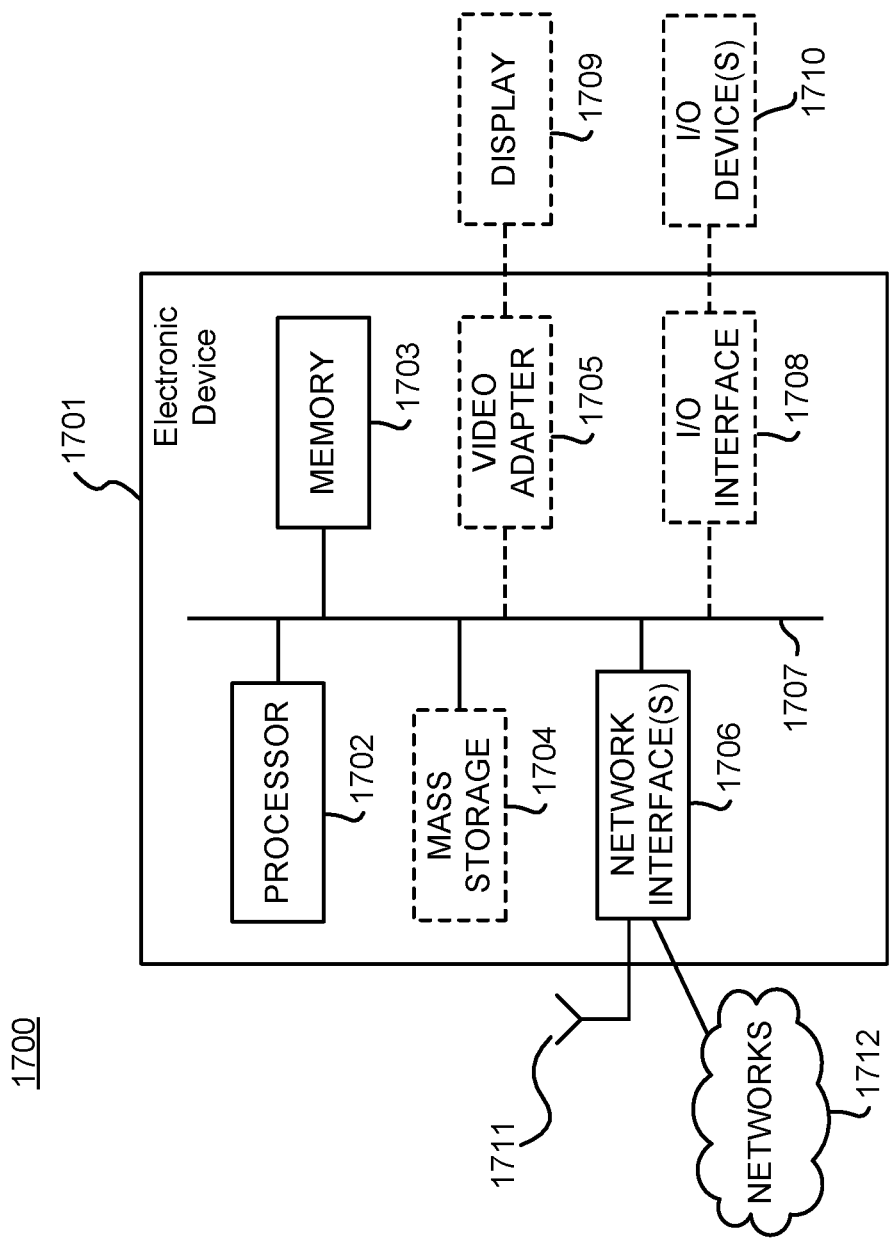
FIG. 17 is a block diagram of an electronic device within a computing and communications environment that may be used for implementing devices and methods in accordance with representative embodiments of the present invention.

FIG. 17 is a block diagram of an electronic device (ED) 1701 illustrated within a computing and communications environment 1700 that may be used for implementing the devices and methods disclosed herein. In some embodiments, the electronic device may be an element of communications network infrastructure, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a public land mobility network (PLMN). In other embodiments, the electronic device may be a device that connects to the network infrastructure over a radio interface, such as a mobile phone, smart phone or other such device that may be classified as a User Equipment (UE). In some embodiments, ED 1701 may be a machine type communications (MTC) device (also referred to as a machine-to-machine (M2M) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 1701 typically includes a processor 1702, such as a central processing unit (CPU), and may further include specialized processors such as a graphics processing unit (GPU) or other such processor, a memory 1703, a network interface 1706 and a bus 1707 to connect the components of ED 1701. ED 1301 may optionally also include components such as a mass storage device 1704, a video adapter 1705, and an I/O interface 1708 (shown in dashed lines).

The memory 1703 may comprise any type of non-transitory system memory, readable by the processor 1702, such as static random access memory (SRAM), dynamic random access memory (DRAM), synchronous DRAM (SDRAM), read-only memory (ROM), or a combination thereof. In an embodiment, the memory 1703 may include more than one type of memory, such as ROM for use at boot-up, and DRAM for program and data storage for use while executing programs. The bus 1707 may be one or more of any type of several bus architectures including a memory bus or memory controller, a peripheral bus, or a video bus.

The electronic device 1701 may also include one or more network interfaces 1706, which may include at least one of a wired network interface and a wireless network interface. As illustrated in FIG. 17, network interface 1706 may include a wired network interface to connect to a network 1712, and also may include a radio access network interface 1711 for connecting to other devices over a radio link. When ED 1701 is a network infrastructure element, the radio access network interface 1711 may be omitted for nodes or functions acting as elements of the PLMN other than those at the radio edge (e.g. an eNB). When ED 1701 is infrastructure at the radio edge of a network, both wired and wireless network interfaces may be included. When ED 1701 is a wirelessly connected device, such as a User Equipment, radio access network interface 1711 may be present and it may be supplemented by other wireless interfaces such as WiFi network interfaces. The network interfaces 1706 allow the electronic device 1701 to communicate with remote entities such as those connected to network 1712.

The mass storage 1704 may comprise any type of non-transitory storage device configured to store data, programs, and other information and to make the data, programs, and other information accessible via the bus 1707. The mass storage 1704 may comprise, for example, one or more of a solid state drive, hard disk drive, a magnetic disk drive, or an optical disk drive. In some embodiments, mass storage 1704 may be remote to the electronic device 1701 and accessible through use of a network interface such as interface 1706. In the illustrated embodiment, mass storage 1704 is distinct from memory 1703 where it is included, and may generally perform storage tasks compatible with higher latency, but may generally provide lesser or no volatility. In some embodiments, mass storage 1704 may be integrated with a heterogeneous memory 1703.

The optional video adapter 1705 and the I/O interface 1708 (shown in dashed lines) provide interfaces to couple the electronic device 1701 to external input and output devices. Examples of input and output devices include a display 1709 coupled to the video adapter 1705 and an I/O device 1710 such as a touch-screen coupled to the I/O interface 1709. Other devices may be coupled to the electronic device 1701, and additional or fewer interfaces may be utilized. For example, a serial interface such as universal serial bus (USB) (not shown) may be used to provide an interface for an external device. Those skilled in the art will appreciate that in embodiments in which ED 1701 is part of a data center, I/O interface 1708 and Video Adapter 1705 may be virtualized and provided through network interface 1706.

In some embodiments, electronic device 1701 may be a standalone device, while in other embodiments electronic device 1701 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

According to embodiments, there is provided a method for managing user equipment (UE) in a communication network. The method includes receiving, by a network function, a request from a UE, said UE belonging to a UE group and generating, by the network function, a UE group context for the UE group.

According to some embodiments, the UE group context includes a UE group identifier. According to some embodiments, the UE group context includes one or more protocol data unit (PDU) session identifiers. According to some embodiments, the UE group context includes one or more shared protocol data unit (PDU) session identifiers. According to some embodiments, the UE group context includes a list of UE IDs which are members of the UE group.

According to embodiments, there is provided a method for managing user equipment (UE) in a communication network. The includes receiving, by a network function, a request including data indicative of a UE group and transmitting, by the network function, a notification, the notification based upon the request and the data.

According to some embodiments the data includes a UE group identifier. According to some embodiments, the data includes one or more protocol data unit (PDU) session identifiers. According to some embodiments, the data includes one or more shared protocol data unit (PDU) session identifiers. According to some embodiments, the request includes a request for modification of a shared PDU session and wherein the notification includes a rejection. According to some embodiments, the request includes a network exposure function (NEF) relocation request and wherein the notification includes data indicative of a UE group context and wherein the UE group context includes one or more of a UE group identifier, protocol data unit (PDU) session identifier and a shared PDU session identifier.

According to embodiments, there is provided a network function including a network interface for receiving data from and transmitting data to network functions connected to a network, a processor and a non-transient memory for storing instructions that when executed by the processor cause the network function to be configured to perform one or more of the methods defined above.

According to embodiments, when the UE is moving, the V2X Application Server may be relocated to meet the packet delay requirements. It is proposed to specify criteria for selecting the NEF to support domain management and to minimize the delay of transferring the control and possible data packets over the NEF.

Since the NEF is the interface for exchanging control messages between the AF and CN network functions, it is important to make sure that the NEF is properly selected to minimize the delay of control messages and possible data packets sent over the NEF. For example, in V2X applications, many control messages sent from AS/AF to the UE are location-dependent. If the location information of the UE is not quickly sent to the AF, the AF/AS may send incorrect control messages to the UE. Hence it is important to study existing mechanisms for NEF selection and identify possible issues for improvements.

According to embodiments, a basic NEF selection solution mechanism is provided. The AF can discover the NEF instances by using the CAPIF framework. In the SA WG2 meeting #125, SA WG2 agreed to support CAPIF Error! Reference source not found. Therefore, it is assumed that the work of SA2 on NEF discovery in 5GC shall be carried in parallel.

This solution addresses Key Issue #8 (Support of edge computing). When a vehicle travels a long distance, the V2X Application Server (V2X AS) may be relocated along with the V2X UE in the vehicle to guarantee low packet delay requirements. FIG. 13 illustrates possible relocations of the network functions and V2X AS along with the UE's trajectory. The MEC Orchestrator coordinates the operation of V2X ASs. The CP messages between the MEC Orchestrator and the CN are exchanged via the AF and NEF. The NEF may be required as specified in clause 5.6.7 "Application Function influence on traffic", TS 23.501 [7]. The UP connection between the UE and V2X AS is provided by a (R)AN node, UPF, and DNAI. To support the UE mobility, the following steps can be carried out: 1) The moving UE is now served by a different RAN node, 2) The UPF and CP NFs may be re-selected, 3) The V2X AS may be relocated. The 5GC provides methods for the CN and the AF to negotiate the DNAI, 4) The NEF may be (re)selected.

Except for the NEF selection, other selection or reselection procedures have been specified (for (R)AN, AMF, UPF, DNAI) or being studied (in case of SMF). The UE can be handed over between RAN nodes as described in TS 23.502 [9], clause 4.9. The re-selection of UPF and DNAI have been specified in TS 23.501 [7], in clause 5.6.7 'Application Function influence on traffic routing' and clause 5.13 'Support for Edge Computing'. The AMF may be re-allocated as described in TS 23.502 [9], clause 4.2.2.2.3 "Registration with AMF re-allocation". The relocation of some CP functions can be separately studied. For example, the relocation of SMF and UP is being studied in Release 16 SID "Study on Enhancing Topology of SMF and UPF in 5G Networks" (ETSUN) [11].

Currently, the NEF selection is not explicitly specified in TS 23.501 and TS 23.502. Anyway, according to the Common API Framework (CAPIF) [10] supported in 5GS, the AF can discover NEF instances by using CAPIF services. Multiple NEF instances may be assigned to serve one or multiple applications for mitigating potential denial of service (DoS) attacks as well as to improve domain administration and signalling efficiency. The AF may select an NEF to send requests to the CN and subscribes to network exposure events. The NEF re-selection may be required to reduce the packet delay for control messages as well as load balancing, if needed.

One NEF instance can be configured to serve one or multiple Applications, one or multiple Network Slice instances, one or multiple DNs, one or multiple Geographical Zones, one or multiple DNAIs, one or multiple UE groups. The NEF configuration information can be stored in the CAPIF Core Function, NRF, or the AF.

During the movement, the V2X UE may be served by a different set of CN functions in different administrative domains. If V2X Application knows the trajectory of the vehicle, the V2X Application may select different NEF instances, each for one administrative domain, to send AF-Influence Traffic Routing requests and subscribe to the CN event exposure services. These procedures could be performed anytime by the AF to make sure that the control link between the AF and CN is ready to serve the UE whenever the UE enters an administrative domain.

The AF may cancel the AF-Influence Traffic Routing requests and unsubscribe to the CN exposure events at an NEF when the V2X UE is no longer in an administrative domain.

Figure 18:
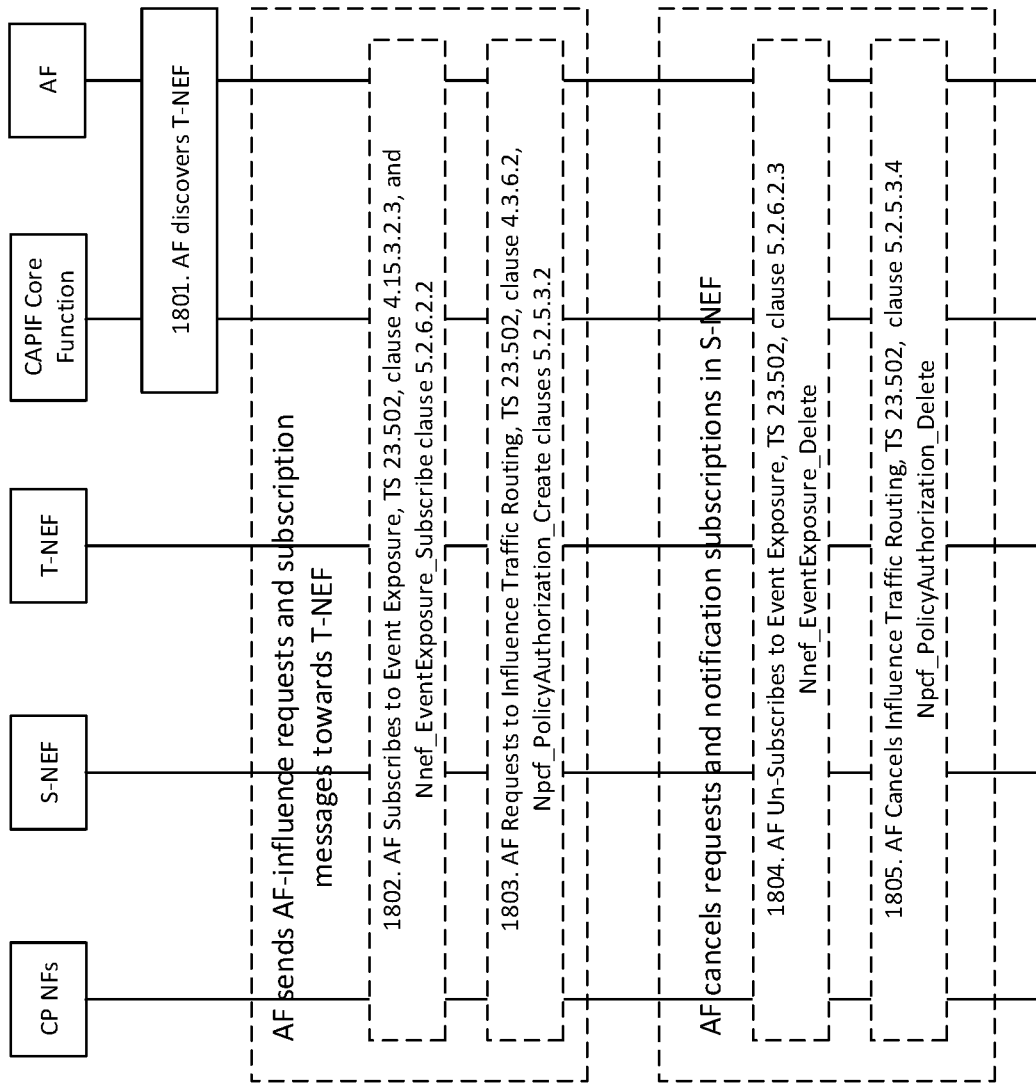
FIG. 18 illustrates a method of NEF selection or reselection in accordance with embodiments of the present invention.

During the lifetime of a PDU Session of a V2X Application, the NEF may be (re)selected to support control messages exchanged between CN functions and the AF. FIG. 18 provides a high-level procedure for NEF (re) selection. The AF is currently served by a Source NEF (S-NEF). The AF may want to connect to another Target NEF (T-NEF).

In accordance with embodiments of the present invention this procedure is illustrated in FIG. 18.

In step 1801, if the AF has not yet discovered a T-NEF, the AF discovers a set of T-NEF(s) by using the Service API Discover of CAPIF Core function as described in 3GPP TS 23.222, clause 8.7 [10]. The AF may send the following query information for NEF discovery: DNN, S-NSSAI, External Group ID, and application information (Geographical Zone IDs, AF-Service-Identifier, DNAI).

In step 1802 the AF may subscribe to Event Exposure Services provided by the T-NEF. The AF may use Nnef_EventExposure_Subscribe provided by the T-NEF to send event subscriptions to the CN.

In step 1803 the AF may send request to influence traffic routing to the T-NEF by using Npcf_PolicyAuthorization_Create service described in clause 5.2.5.3.2, as part of AF-Influence Traffic Routing procedure in clause 4.3.6.2 of TS 23.502. The T-NEF may perform PCF discovery procedure to identify the serving PCF.

In step 1804 the AF may unsubscribe to event exposure services of the S-NEF by using Nnef_EventExposure_Delete service, described in clause 5.2.6.2.3 of TS 23.502. The S-NEF may cancel network exposure services provided by the UDM, AMF, and PCF.

In step 1805 the AF may cancel the AF-influence traffic routing requests previously sent to the S-NEF by using Npcf_PolicyAuthorization_Delete service as described in clause 5.2.5.3.4 of TS 23.502.

The procedure in FIG. 18 uses some existing services of NEF. The only required change is to specify the information the NEF provides to the CAPIF Core Function for NEF (re)selection in TS 23.501 and TS 23.502, including: DNN, S-NSSAI, External Group ID, and application information (Geographical Zone IDs, AF-Service-Identifier, DNAI).

Additional work on NEF discovery may be specified in CAPIF framework.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
    receiving, by a network exposure function (NEF), a request, wherein the request includes information identifying a user equipment (UE) group which includes member UEs; and
    sending, by the NEF to a unified data management (UDM), a message including the information identifying the UE group; and
    assigning, by the UDM, an internal group identifier (ID) for the UE group;
    informing, by the UDM, the NEF the internal group ID, wherein the internal group ID is mapped to the information identifying the UE group received from the NEF.

2. The method according to claim 1, wherein the UDM is selected by the NEF.

3. The method according to claim 1, wherein the information identifying the UE group comprises an external group identifier identifying the UE group.

4. The method according to claim 1, wherein the request further comprises a list of generic public subscription identifiers (GPSIs), each GPSI identifying a member UE in the UE group.

5. The method according to claim 4, wherein the message further comprises the list of GPSIs.

6. The method according to claim 1, wherein the request further comprises a transaction ID representing the request.

7. The method according to claim 1, wherein the message indicates to create or modify or delete the UE group.

8. The method according to claim 7, further comprising:
    according to the message, performing, by the UDM, at least one action of creating the UE group, modifying the UE group, or deleting the UE group.

9. The method according to claim 1, wherein the message further comprises network slice information associated with the UE group.

10. The method according to claim 9, wherein the network slice information comprises single network slice selection assistance information (S-NSSAI).

11. The method according to claim 1, wherein the internal group ID is unique for the UE group.

12. The method according to claim 1, wherein the information identifying the UE group is used for a creation of a UE route selection policy (URSP) for at least one of the member UEs in the UE group.

13. The method according to claim 12, wherein the creation of the URSP is performed by a policy control function (PCF).

14. The method according to claim 13, wherein the creation of the URSP is further based on at least one of information of each member UE in the UE group or service subscription information.

15. The method according to claim 1, wherein the member UEs in the UE group are severed by a same session management function (SMF) selected by an access management function (AMF).

16. The method according to claim 1, wherein the member UEs in the UE group are severed by a same user plane function (UPF) selected by a session management function (SMF).

17. The method according to claim 1, wherein the request is sent from an application function (AF).

18. A system comprising:
    at least one processor and a memory storing instructions for execution by the at least one processor to implement a network exposure function (NEF) and a unified data management (UDM), the NEF and the UDM being communicatively coupled through an interface, wherein
    the NEF is configured to receive a request comprising information identifying a user equipment (UE) group which includes member UEs, and send a message including the information identifying the UE group to the UDM; and
    the UDM is configured to receive the message, assign an internal group ID for the UE group and inform the NEF the internal group ID, wherein the internal group ID is mapped to the information identifying the UE group received from the NEF.

19. The system according to claim 18, wherein the NEF is further configured to select the UDM from a set of UDMs.

20. The system according to claim 18, wherein the UDM is further configured to perform at least one action of creating the UE group, modifying the UE group, or deleting the UE group according to the message.

21. The system according to claim 18, further comprising a policy control function (PCF) configured to create a UE route selection policy (URSP) for at least one of the member UEs in the UE group based on the information identifying the UE group, and at least one of information of each member UE in the UE group or service subscription information.

22. The system according to claim 18, further comprising an access management function (AMF) configured to select a same session management function (SMF) to serve the member UEs in the UE group.

23. The system according to claim 18, further comprising a session management function (SMF) configured to select a same user plane function (UPF) to serve the member UEs in the UE group.

* * * * *